(12) United States Patent
Zhang

(10) Patent No.: US 12,481,308 B2
(45) Date of Patent: Nov. 25, 2025

(54) CLOCK CONTROL METHOD, DEVICE FOR SWITCH CHIP, AND SWITCH BOARD

(71) Applicant: SUZHOU METABRAIN INTELLIGENT TECHNOLOGY CO., LTD., Jiangsu (CN)

(72) Inventor: Tao Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/116,159

(22) PCT Filed: Dec. 26, 2023

(86) PCT No.: PCT/CN2023/141950
§ 371 (c)(1),
(2) Date: Mar. 27, 2025

(87) PCT Pub. No.: WO2024/259940
PCT Pub. Date: Dec. 26, 2024

(65) Prior Publication Data
US 2025/0264907 A1 Aug. 21, 2025

(30) Foreign Application Priority Data
Jun. 21, 2023 (CN) .......................... 202310743573.2

(51) Int. Cl.
*G06F 1/04* (2006.01)
(52) U.S. Cl.
CPC ...................... *G06F 1/04* (2013.01)
(58) Field of Classification Search
CPC ... G06F 1/08; G06F 1/10; G06F 1/324; G06F 1/12; G06F 1/3203; G06F 1/04;
(Continued)

(56) References Cited

U.S. PATENT DOCUMENTS

| 2008/0094117 A1* | 4/2008 | Stoler | G11C 7/22 327/141 |
| 2011/0050300 A1* | 3/2011 | Klapproth | G06F 1/08 327/144 |

(Continued)

FOREIGN PATENT DOCUMENTS

| CN | 112463697 A | 3/2021 |
| CN | 115580365 A | 1/2023 |

(Continued)

OTHER PUBLICATIONS

The first search report of CN application No. 202310743573.2 issued on Jul. 27, 2023.

(Continued)

*Primary Examiner* — John W Poos
(74) *Attorney, Agent, or Firm* — Scully, Scott, Murphy & Presser, P.C.

(57) ABSTRACT

Provided are a clock control method, device for a switch chip, and a switch board. The method is applied to a clock control device, and includes: receiving clock signals transmitted by clock generators of a plurality of clock types, the clock control device is connected to a switch chip, the switch chip uses clock signals of different clock types in response to controlling target devices of different device types, and the plurality of clock types correspond to a plurality of device types; identifying a target device type of the plurality of device types, to which a target device belongs; and transmitting, to the switch chip and the target device, a target clock signal transmitted by a target clock generator of the clock generators of the plurality of clock types, the target clock generator is a clock generator of a target clock type corresponding to the target device type.

19 Claims, 10 Drawing Sheets

(58) Field of Classification Search
CPC ...... G06F 13/1689; G06F 1/3296; G06F 1/06;
G06F 9/3867; G06F 13/28; G06F 1/3237;
G06F 13/16; G06F 3/0673; G06F 1/3287;
G06F 11/3656; G06F 30/33; G06F
13/4291; G06F 8/65; G06F 12/04; G06F
1/14; G06F 12/0207; G06F 30/3312;
G06F 1/3206; G06F 12/0607; G06F
30/327; G06F 9/4494; G06F 11/27; G06F
13/1673; G06F 13/4282; G06F 30/331;
G06F 30/396; G06F 8/60; G06F 2119/12;
G06F 3/0619; G06F 3/065; G06F 11/267;
G06F 30/30; G06F 1/26; G06F 3/061;
G06F 1/3243; G06F 11/3407; G06F
11/261; G06F 11/3466; G06F 30/394;
G06F 13/4068; G06F 11/0793; G06F
13/1668; G06F 13/1694; G06F 30/39;
G06F 30/398; G06F 1/3228; G06F
11/1604; G06F 3/0683; G06F 11/22;
G06F 30/392; G06F 1/28; G06F 30/34;
G06F 5/06; G06F 9/4893; G06F 13/4086;
G06F 1/206; G06F 1/32; G06F 1/329;
G06F 15/7807; G06F 3/0658; G06F 1/30;
G06F 2201/88; G06F 30/3315; G06F
30/333; G06F 30/347; G06F 1/025; G06F
11/0721; G06F 13/20; G06F 15/7867;
G06F 3/0659; G06F 13/4221; G06F
3/0604; G06F 3/0647; G06F 9/3836;
G06F 1/24; G06F 11/0706; G06F
11/2733; G06F 11/36; G06F 13/385;
G06F 13/4027; G06F 13/42; G06F
2009/45591; G06F 2211/902; G06F 7/68;
G06F 9/30101; G06F 9/3869; G06F
9/4401; G06F 9/44505; G06F 9/45558;
G06F 9/5094; G06F 1/305; G06F
11/2236; G06F 11/3058; G06F 13/4022;
G06F 15/167; G06F 2111/04; G06F
30/20; G06F 1/3215; G06F 1/3275; G06F
13/4295; G06F 2213/0026; G06F 3/0601;
G06F 3/0607; G06F 3/0629; G06F
30/3323; G06F 12/0862; G06F 13/102;
G06F 13/287; G06F 13/3625; G06F
13/38; G06F 13/4243; G06F 2117/08;
G06F 3/0626; G06F 9/3863; G06F
1/3253; G06F 11/1405; G06F 11/3471;
G06F 13/14; G06F 13/40; G06F 13/4278;
G06F 15/17381; G06F 16/22; G06F
21/85; G06F 3/0674; G06F 7/588; G06F
9/5027; G06F 9/5038; G06F 1/3225;
G06F 1/325; G06F 11/3636; G06F
11/364; G06F 13/4072; G06F 13/4217;
G06F 15/7825; G06F 2213/40; G06F
3/04842; G06F 3/04847; G06F 5/10;
G06F 9/30047; G06F 9/30181; G06F
1/1626; G06F 1/1632; G06F 1/263; G06F
1/266; G06F 1/3209; G06F 1/3234; G06F
11/0724; G06F 11/0751; G06F 11/16;
G06F 11/2273; G06F 11/362; G06F
12/0864; G06F 13/1663; G06F 13/34;
G06F 13/405; G06F 15/17318; G06F
21/602; G06F 21/74; G06F 2205/104;
G06F 2213/0002; G06F 3/0625; G06F
3/0653; G06F 3/0688; G06F 7/584; G06F
9/06; G06F 9/3806; G06F 1/3265; G06F
11/008; G06F 11/2289; G06F 11/25;
G06F 11/3409; G06F 12/00; G06F
12/0246; G06F 12/1027; G06F 12/14;
G06F 13/1684; G06F 13/22; G06F
13/364; G06F 13/382; G06F 13/4204;
G06F 13/4234; G06F 15/17312; G06F
21/44; G06F 21/72; G06F 21/755; G06F
21/79; G06F 2115/02; G06F 2212/6022;
G06F 2213/0038; G06F 2213/0042; G06F
3/05; G06F 3/0634; G06F 3/0656; G06F
3/0679; G06F 7/523; G06F 7/582; G06F
9/3004; G06F 9/3802; G06F 9/3858;
G06F 9/3885; G06F 1/3259; G06F
1/3271; G06F 11/221; G06F 11/263;
G06F 11/273; G06F 11/3034; G06F
11/3041; G06F 12/0811; G06F 12/0831;
G06F 13/00; G06F 13/105; G06F
13/4004; G06F 13/4256; G06F 15/16;
G06F 15/17387; G06F 15/76; G06F
15/781; G06F 15/7889; G06F 15/8069;
G06F 17/142; G06F 17/16; G06F
2115/10; G06F 2205/061; G06F
2209/501; G06F 2212/1016; G06F
2212/602; G06F 2212/6024; G06F
2212/6032; G06F 2213/3852; G06F
3/0481; G06F 3/0482; G06F 3/0488;
G06F 3/0614; G06F 3/0646; G06F
3/0676; G06F 3/1415; G06F 30/337;
G06F 30/367; G06F 5/065; G06F 5/14;
G06F 7/00; G06F 7/5443; G06F 7/57;
G06F 9/30156; G06F 9/30189; G06F
9/3832; G06F 9/3851; G06F 9/3861;
G06F 9/451; G06F 9/455; G06F 9/52;
G06F 9/526; G06F 1/00; G06F 1/105;
G06F 1/183; G06F 1/203; G06F 1/3212;
G06F 1/3284; G06F 11/0745; G06F
11/079; G06F 11/10; G06F 11/106;
G06F 11/2247; G06F 11/24; G06F 11/30;
G06F 11/3037; G06F 11/3055; G06F 11/348;
G06F 12/0857; G06F 12/0859; G06F
13/126; G06F 13/1605; G06F 13/161;
G06F 13/1626; G06F 13/24; G06F 13/36;
G06F 13/362; G06F 13/387; G06F
13/4247; G06F 13/4273; G06F 15/7832;
G06F 15/7864; G06F 2015/765; G06F
21/57; G06F 21/86; G06F 2115/08; G06F
2205/102; G06F 2205/106; G06F
2207/581; G06F 2212/6026; G06F
2213/0004; G06F 2221/2129; G06F
3/015; G06F 3/0412; G06F 3/0416; G06F
3/044; G06F 3/0487; G06F 3/06; G06F
3/0622; G06F 3/0632; G06F 3/0671;
G06F 3/0685; G06F 3/162; G06F 30/35;
G06F 5/08; G06F 7/58; G06F 8/4442;
G06F 8/61; G06F 9/30029; G06F 9/3012;
G06F 9/30145; G06F 9/3808; G06F
9/3824; G06F 9/3844; G06F 9/3854;
G06F 9/3897; G06F 9/46; G06F 9/48;
G06F 9/4881; G06F 1/163; G06F 1/3278;
G06F 1/3293; G06F 11/00; G06F
11/0727; G06F 11/0766; G06F 11/1048;
G06F 11/1076; G06F 11/142; G06F
11/1679; G06F 11/2015; G06F 11/2041;
G06F 11/2053; G06F 11/2071; G06F
11/2082; G06F 11/2094; G06F 11/28;
G06F 11/3003; G06F 11/3006; G06F 11/3024; G06F 11/3027; G06F 11/3051;
G06F 11/3089; G06F 11/3414; G06F
11/3632; G06F 11/3648; G06F 12/02;
G06F 12/0623; G06F 12/08; G06F
12/0802; G06F 12/0875; G06F 12/0877;
G06F 12/0879; G06F 12/16; G06F
13/1636; G06F 13/1678; G06F 13/368;
G06F 13/4018; G06F 13/4031; G06F
13/404; G06F 13/4045; G06F 13/4054;
G06F 13/4059; G06F 13/4226; G06F
13/4286; G06F 15/17306; G06F 15/78;
G06F 15/7839; G06F 15/7842; G06F
15/82; G06F 16/9017; G06F 17/00; G06F
17/11; G06F 18/23213; G06F 2117/10;
G06F 2212/1028; G06F 2212/601; G06F
2212/6082; G06F 2212/657; G06F
2212/68; G06F 2212/683; G06F
2213/0016; G06F 2213/0064; G06F
2213/3804; G06F 3/0233; G06F 3/0362;
G06F 3/04166; G06F 3/0605; G06F
3/0635; G06F 3/0644; G06F 3/0655;
G06F 3/0689; G06F 3/14; G06F 3/1431;
G06F 30/373; G06F 30/3947; G06F
7/501; G06F 7/535; G06F 8/30; G06F
8/4432; G06F 8/452; G06F 9/30; G06F
9/30003; G06F 9/30043; G06F 9/30083;
G06F 9/30192; G06F 9/3455; G06F 9/38;
G06F 9/3812; G06F 9/3828; G06F 9/383;
G06F 9/384; G06F 9/3848; G06F 9/3856;
G06F 9/3871; G06F 9/4418; G06F 9/50;
G06F 9/5005; G06F 9/5016; G06F
9/5044; G06F 1/0321; G06F 11/073;
G06F 11/0784; G06F 11/1012; G06F
11/1044; G06F 11/1068; G06F 11/1456;
G06F 11/1461; G06F 11/1464; G06F
11/2205; G06F 11/26; G06F 11/322;
G06F 11/323; G06F 11/34; G06F
11/3495; G06F 11/3612; G06F 11/3652;
G06F 11/3676; G06F 12/0238; G06F
12/0646; G06F 12/0855; G06F 12/0882;
G06F 12/0888; G06F 12/0891; G06F
12/0895; G06F 12/1054; G06F 12/121;
G06F 12/123; G06F 12/124; G06F
13/128; G06F 13/1642; G06F 13/32;
G06F 13/366; G06F 13/4013; G06F
13/409; G06F 13/423; G06F 13/4239;
G06F 15/00; G06F 15/161; G06F 15/17;
G06F 15/177; G06F 15/7814; G06F
15/80; G06F 16/2365; G06F 16/24575;
G06F 16/27; G06F 16/93; G06F 21/32;
G06F 21/52; G06F 21/575; G06F 21/75;
G06F 21/76; G06F 2111/08; G06F
2111/10; G06F 2117/04; G06F 2119/06;
G06F 2200/201; G06F 2201/82; G06F
2209/484; G06F 2209/5012; G06F
2209/5021; G06F 2212/1024; G06F
2212/2515; G06F 2212/302; G06F
2212/452; G06F 2212/6046; G06F
2212/7203; G06F 2212/7205; G06F
2213/0008; G06F 3/041; G06F 3/04186;
G06F 3/0484; G06F 3/0617; G06F
3/0665; G06F 3/147; G06F 3/165; G06F
3/167; G06F 30/32; G06F 30/323; G06F
30/3308; G06F 5/085; G06F 7/38; G06F
7/4824; G06F 7/5318; G06F 7/5332;
G06F 7/70; G06F 8/447; G06F 8/654;
G06F 9/22; G06F 9/30014; G06F
9/30018; G06F 9/30025; G06F 9/30032;
G06F 9/30036; G06F 9/30038; G06F
9/3005; G06F 9/30072; G06F 9/30087;
G06F 9/30098; G06F 9/30141; G06F
9/323; G06F 9/3804; G06F 9/3814; G06F
9/3842; G06F 9/3873; G06F 9/4403;
G06F 9/4405; G06F 9/4406; G06F
9/44521; G06F 9/44573; G06F 9/466;
G06F 9/4812; G06F 9/4887; G06F 9/505;
G06F 9/524; H03L 7/0814; H03L 7/085;
H03L 7/18; H03L 7/087; H03L 7/0995;
H03L 7/07; H03L 7/08; H03L 7/00;
H03L 7/099; H03L 7/093; H03L 7/081;
H03L 7/0805; H03L 7/0812; H03L
7/0816; H03L 7/06; H03L 7/091; H03L
7/0991; H03L 7/089; H03L 7/0807; H03L
7/0891; H03L 7/16; H03L 7/095; H03L
1/00; H03L 7/0996; H03L 7/22; H03L
7/24; H03L 2207/50; H03L 7/0818; H03L
7/0802; H03L 2207/14; H03L 7/183;
H03L 7/10; H03L 7/0898; H03L 7/0992;
H03L 7/1974; H03L 7/1976; H03L 7/235;
H03L 5/00; H03L 7/083; H03L 7/1072;
H03L 2207/06; H03L 7/0994; H03L 7/23;
H03L 7/097; H03L 7/191; H03L 7/14;
H03L 1/022; H03L 7/113; H03L 7/02;
H03L 7/0997; H03L 7/141; H03L 7/1972;
H03L 7/193; H03L 7/197; H03L 7/0895;
H03L 7/0998; H03L 1/027; H03L 3/00;
H03L 7/102; H03L 7/1075; H03L 1/026;
H03L 7/148; H03L 7/181; H03L 7/195;
H03L 7/26; H03L 1/028; H03L 2207/08;
H03L 7/103; H03L 7/104; H03L 7/143;
H03L 7/146; H03L 7/1803; H03L 7/1806;
H03L 7/189; H03L 1/02; H03L 1/04;
H03L 7/0896; H03L 7/145; H03L 7/187;
H03K 5/135; H03K 3/0315; H03K
5/1565; H03K 5/133; H03K 19/20; H03K
2005/00019; H03K 5/05; H03K
2005/00058; H03K 5/13; H03K 3/012;
H03K 5/26; H03K 5/131; H03K
2005/00078; H03K 5/14; H03K 5/156;
H03K 5/00; H03K 5/19; H03K 3/011;
H03K 5/00006; H03K 3/0307; H03K
3/0375; H03K 5/01; H03K 5/15013;
H03K 3/017; H03K 7/06; H03K 19/0016;
H03K 2005/00039; H03K 3/0322; H03K
5/2481; H03K 2005/00143; H03K
2005/00286; H03K 23/00; H03K 3/037;
H03K 3/02315; H03K 5/1252; H03K
5/1534; H03K 7/08; H03K 19/00; H03K
19/096; H03K 19/1733; H03K 3/013;
H03K 5/06; H03K 5/159; H03K 5/24;
H03K 19/17728; H03K 21/38; H03K
23/68; H03K 3/03; H03K 5/125; H03K
19/1737; H03K 19/177; H03K 21/00;
H03K 3/0231; H03K 19/0005; H03K
19/0008; H03K 19/00384; H03K
19/017509; H03K 19/018521; H03K
19/1774; H03K 2005/00071; H03K
23/425; H03K 3/02; H03K 5/04; H03K
19/01; H03K 2005/00026; H03K 23/58;
H03K 5/134; H03K 5/15; H03K 5/249;

H03K 17/145; H03K 17/28; H03K 17/687; H03K 19/1731; H03K 19/1776; H03K 2005/00013; H03K 2005/00052; H03K 21/023; H03K 23/40; H03K 23/54; H03K 3/353; H03K 3/356182; H03K 3/86; H03K 4/501; H03K 5/1506; H03K 5/151; H03K 17/693; H03K 19/00315; H03K 19/00369; H03K 19/01742; H03K 19/01855; H03K 19/21; H03K 2005/00241; H03K 21/02; H03K 21/026; H03K 21/10; H03K 2217/0036; H03K 23/486; H03K 23/502; H03K 4/026; H03K 7/00; H03K 17/005; H03K 17/16; H03K 19/00346; H03K 19/0175; H03K 19/173; H03K 19/17716; H03K 19/17768; H03K 2005/00104; H03K 2005/00234; H03K 21/08; H03K 21/406; H03K 23/66; H03K 23/662; H03K 23/667; H03K 3/00; H03K 3/014; H03K 3/027; H03K 3/0372; H03K 3/356173; H03K 3/3562; H03K 3/84; H03K 4/48; H03K 5/082; H03K 5/15066; H03K 5/1508; H03K 17/002; H03K 17/063; H03K 17/56; H03K 17/661; H03K 17/6872; H03K 17/96; H03K 19/1732; H03K 19/1738; H03K 19/17764; H03K 2005/00065; H03K 2005/00091; H03K 2005/00247; H03K 21/40; H03K 23/507; H03K 23/64; H03K 23/70; H03K 27/00; H03K 3/01; H03K 3/0233; H03K 3/35613; H03K 3/78; H03K 4/502; H03K 4/92; H03K 5/023; H03K 5/12; H03K 5/1502; H03K 5/1504; H03K 5/22

See application file for complete search history.

(56) References Cited

U.S. PATENT DOCUMENTS

| 2015/0033101 | A1* | 1/2015 | Chebruch | G06F 1/04 714/798 |
| 2016/0116934 | A1* | 4/2016 | Ha | G06F 1/3287 327/298 |
| 2018/0210652 | A1 | 7/2018 | Chen | |

FOREIGN PATENT DOCUMENTS

| CN | 116132009 A | 5/2023 |
| CN | 116488767 A | 7/2023 |

OTHER PUBLICATIONS

The search report of PCT application No. PCT/CN2023/141950 issued on Apr. 1, 2024.
The second search report of CN application No. 202310743573.2 issued on Aug. 23, 2023.
The Written Opinion of PCT application No. PCT/CN2023/141950 issued on Apr. 1, 2024.

* cited by examiner

CLOCK CONTROL METHOD, DEVICE FOR SWITCH CHIP, AND SWITCH BOARD

CROSS-REFERENCE TO RELATED APPLICATION

The present application claims the priority to the Chinese patent application No. 202310743573.2, titled "CLOCK CONTROL METHOD, SYSTEM AND DEVICE FOR SWITCH CHIP, AND SWITCH BOARD", filed to the Patent Office of the People's Republic of China on Jun. 21, 2023, which is incorporated herein in its entirety by reference.

TECHNICAL FIELD

Embodiments of the present application relate to the field of chips, and particularly to a clock control method, device for a switch chip, and a switch board.

BACKGROUND

A compute express link (CXL) technique is a cache-coherent interconnect protocol established on a peripheral component interconnect express standard (fifth generation) (PCIe 5.0) physical bus. The CXL technique may be used for a processor, memory expansion, and an accelerator, and allows resource sharing for higher performance. Currently, compute express link 2.0 (CXL 2.0) has been proposed in the industry, introducing a switch (SW) function to support connection with more devices and allowing a server to allocate a corresponding resource according to a workload requirement, so as to improve resource utilization and reduce an overall system cost.

Compute express link switch (CXL SW) is capable of supporting not only a working mode of a CXL device, but also an application scenario of a peripheral component interconnect express (PCIe) device, thereby causing a problem in choosing a clock mode: a PCIe device is required to work in a mode where a system clock of the SW and a reference clock share a common source, while a CXL device is required to work in a non-homologous clock mode. To enable the CXL SW to be compatible with clocks of two different devices, in related technologies, a clock mode generally is selected manually according to different plugged-in devices. However, such a method is inefficient, and as homologous clocks usually are connected through a cable, resulting in a long link, if a selected homologous clock signal has poor quality, a device is prone to be unrecognized by a central processing unit (CPU).

With respect to the problem of low clock adaptation efficiency of a switch chip, etc. in the related technologies, no effective solution has been proposed yet.

SUMMARY

Embodiments of the present application provide a clock control method, device for a switch chip, and a switch board.

According to an embodiment of the present application, a clock control device for a switch chip is provided. The device includes a clock controller and a clock selector; the clock controller is connected to the clock selector, the clock selector is allowed to be connected to clock generators of a plurality of clock types, a switch chip, and a target device, the switch chip uses clock signals of different clock types in response to controlling target devices belonging to different device types, and the plurality of clock types correspond to a plurality of device types; the clock controller is configured to identify a target device type of the plurality of device types, to which the target device belongs, and control the clock selector to transmit, to the switch chip and the target device, a target clock signal transmitted by a target clock generator of the clock generators of the plurality of clock types. The target clock generator is a clock generator of a target clock type corresponding to the target device type.

In an exemplary embodiment, a first control port is deployed on the clock controller, and a plurality of clock ports, a first output port, a second output port and a first signal port are deployed on the clock selector. The first control port is connected to the first signal port, the plurality of clock ports are configured to be connected to the clock generators of the plurality of clock types respectively, the first output port is configured to be connected to the switch chip, and the second output port is configured to be connected to the target device; the clock controller is configured to generate a target control signal corresponding to the target device type, and send the target control signal to the clock selector through the first control port; the clock selector is configured to receive the target control signal through the first signal port, and transmit the target clock signal received on a target clock port corresponding to the target control signal to the first output port and the second output port.

In an exemplary embodiment, the plurality of clock ports include a first clock port and a second clock port. The first clock port is allowed to be connected to a first clock generator of a homologous type, the second clock port is allowed to be connected to a second clock generator of a non-homologous type, the first clock generator is configured to transmit a homologous clock signal, and the second clock generator is configured to transmit a non-homologous clock signal; the clock controller is configured to generate a first control signal in response to the target device type being a first type which is a device type adopting a high-speed serial computer expansion bus standard, generate a second control signal in response to the target device type being a second type which is a device type adopting a compute express link protocol, and send the first control signal or the second control signal to the clock selector through the first control port; the clock selector is configured to transmit the homologous clock signal to the first output port and the second output port in response to receiving the first control signal, and transmit the non-homologous clock signal to the first output port and the second output port in response to receiving the second control signal.

In an exemplary embodiment, a device type port is deployed on the clock controller. The device type port is allowed to be connected to a processor, and the device type port is configured to receive the target device type sent by the processor.

In an exemplary embodiment, the clock control device further includes a clock buffer. The clock controller is connected to the clock buffer, and the clock buffer is also connected between the clock selector and a reference clock generator of the clock generators of the plurality of clock types; the reference clock generator is configured to generate a plurality of clock signals; the clock buffer is configured to buffer the plurality of clock signals; the clock controller is configured to collect signal parameters of the plurality of clock signals, determine signal quality of each of the plurality of clock signals based on the signal parameters, and control the clock buffer to transmit a reference clock signal with the highest signal quality to the clock selector.

In an exemplary embodiment, a second control port is deployed on the clock controller, and a plurality of reference clock ports, a third output port and a second signal port are deployed on the clock buffer. The second control port is connected to the second signal port, the plurality of reference clock ports are configured to be connected to the reference clock generator, and the third output port is configured to be connected to the clock selector; the clock controller is configured to generate a reference control signal corresponding to the reference clock signal, and send the reference control signal to the clock buffer through the second control port; the clock buffer is configured to receive the reference control signal through the second signal port, and transmit the reference clock signal corresponding to the reference control signal to the third output port.

In an exemplary embodiment, the clock control device further includes a signal collector. The signal collector is connected between the reference clock generator and the clock controller; the signal collector is configured to sample the plurality of clock signals to obtain a plurality of sampling signals, and transmit the plurality of sampling signals to the clock controller; the clock controller is configured to calculate the signal parameters of the plurality of sampling signals, and convert the signal parameter of each of the sampling signals into the signal quality of each of the sampling signals. The signal parameter of each of the sampling signals including at least one of an amplitude parameter, a frequency parameter, a slope parameter and a jitter parameter.

According to another embodiment of the present application, a switch board is provided, including a switch chip and a clock control device, the clock control device is connected to the switch chip, and the clock control device is allowed to be connected to a target device and clock generators of a plurality of clock types; the switch chip uses clock signals of different clock types in response to controlling target devices belonging to different device types, and the plurality of clock types correspond to a plurality of device types; the clock control device is configured to identify a target device type of the plurality of device types, to which the target device belongs, and transmit, to the switch chip and the target device, a target clock signal transmitted by a target clock generator of the clock generators of the plurality of clock types. The target clock generator is a clock generator of a target clock type corresponding to the target device type.

In an exemplary embodiment, the clock control device includes a clock controller and a clock selector. The clock controller is connected to the clock selector, and the clock selector is allowed to be connected to the clock generators of the plurality of clock types, the switch chip and the target device; the clock controller is configured to generate a target control signal corresponding to the target device type, and send the target control signal to the clock selector; the clock selector is configured to receive the target control signal, and transmit the target clock signal corresponding to the target control signal to the switch chip and the target device.

In an exemplary embodiment, the clock generators of the plurality of clock types include a first clock generator of a homologous type and a second clock generator of a non-homologous type. The clock selector is connected to each of the first clock generator and the second clock generator, the first clock generator is configured to transmit a homologous clock signal, and the second clock generator is configured to transmit a non-homologous clock signal; the clock controller is configured to generate a first control signal in response to the target device type being a first type which is a device type adopting a high-speed serial computer expansion bus standard, generate a second control signal in response to the target device type being a second type which is a device type adopting a compute express link protocol, and send the first control signal or the second control signal to the clock selector; the clock selector is configured to transmit the homologous clock signal to the switch chip and the target device in response to receiving the first control signal, and transmit the non-homologous clock signal to the switch chip and the target device in response to receiving the second control signal.

In an exemplary embodiment, a reference clock generator of the clock generators of the plurality of clock types is allowed to generate a plurality of clock signals. The clock control device is configured to buffer the plurality of clock signals, collect signal parameters of the plurality of clock signals, determine signal quality of each of the plurality of clock signals based on the signal parameters, and determine a reference clock signal with the highest signal quality as a clock signal corresponding to the reference clock generator.

In an exemplary embodiment, the clock control device includes a clock controller, a clock selector and a clock buffer. The clock controller is connected to the clock selector, the clock selector is allowed to be connected to the clock generators of the plurality of clock types, the switch chip and the target device, and the clock buffer is connected between the reference clock generator and the clock selector; the clock controller is configured to generate a reference control signal corresponding to the reference clock signal, send the reference control signal to the clock buffer, generate a target control signal corresponding to the target device type, send the target control signal to the clock selector; the clock buffer is configured to receive the reference control signal, and transmit the reference clock signal corresponding to the reference control signal to the clock selector; the clock selector is configured to receive the target control signal, and transmit the target clock signal corresponding to the target control signal to the switch chip and the target device.

In an exemplary embodiment, the clock control device is further configured to sample the plurality of clock signals to obtain a plurality of sampling signals, calculate the signal parameters of the plurality of sampling signals, and convert the signal parameter of each of the sampling signals into the signal quality of each of the sampling signals. The signal parameter of each of the sampling signals including at least one of an amplitude parameter, a frequency parameter, a slope parameter and a jitter parameter.

In an exemplary embodiment, the clock control device is allowed to be connected to a processor. The clock control device is configured to receive the target device type sent by the processor.

In an exemplary embodiment, the switch board further includes an uplink connector, a downlink connector and a third clock generator. The third clock generator is connected to the clock control device, the clock control device is connected to a fourth clock generator of a processor through the uplink connector, and the clock generators of the plurality of clock types include the third clock generator and the fourth clock generator; the clock control device is connected to the target device through the downlink connector.

According to still another embodiment of the present application, a clock control system for a switch chip is provided. The system includes a switch board and a device board; a switch chip and a clock control device are deployed on the switch board, and a device interface is deployed on the device board; the device interface is configured to be connected to a target device. The switch chip uses clock signals of different clock types in response to controlling target devices belonging to different device types, and the plurality of clock types correspond to a plurality of device types; the clock control device is configured to identify a target device type of the plurality of device types, to which the target device belongs, and transmit, to the switch chip and the target device, a target clock signal transmitted by a target clock generator of the clock generators of the plurality of clock types. The target clock generator is a clock generator of a target clock type corresponding to the target device type.

In an exemplary embodiment, the system further includes a motherboard. A third clock generator is deployed on the switch board, a fourth clock generator of a processor is deployed on the motherboard, and the clock control device includes a clock controller and a clock selector; the clock controller is connected to the clock selector, the clock selector is connected to the third clock generator, the fourth clock generator, the switch chip and the target device, the third clock generator is configured to transmit a non-homologous clock signal, and the fourth clock generator is configured to transmit a homologous clock signal; the clock controller is configured to generate a first control signal in response to the target device type is a first type which being a device type adopting a high-speed serial computer expansion bus standard, generate a second control signal in response to the target device type being a second type which is a device type adopting a compute express link protocol, and send the first control signal or the second control signal to the clock selector; the clock selector is configured to transmit the homologous clock signal to the switch chip and the target device in response to receiving the first control signal, and transmit the non-homologous clock signal to the switch chip and the target device in response to receiving the second control signal.

In an exemplary embodiment, the fourth clock generator is allowed to generate a plurality of clock signals, and the clock control device further includes a clock buffer. The clock buffer is connected between the fourth clock generator and the clock selector; the clock controller is configured to collect signal parameters of the plurality of clock signals, determine signal quality of each of the plurality of clock signals based on the signal parameters, determine a reference clock signal with the highest signal quality as a clock signal corresponding to the fourth clock generator, generate a reference control signal corresponding to the reference clock signal, and send the reference control signal to the clock buffer; the clock buffer is configured to buffer the plurality of clock signals, receive the reference control signal, and transmit the reference clock signal corresponding to the reference control signal to the clock selector.

In an exemplary embodiment, the processor is deployed on the motherboard, and the clock control device is connected to the processor. The processor is connected to the target device through the switch board and the device board; the processor is configured to output the target device type of the target device during training of the target device, send the target device type to the clock control device; the clock control device is configured to receive the target device type sent by the processor.

According to still another embodiment of the present application, a clock control method for a switch chip is provided. The method is applied to a clock control device, and the method includes:
receiving clock signals transmitted by clock generators of a plurality of clock types. The clock control device is connected to a switch chip, the switch chip uses clock signals of different clock types in response to controlling target devices belonging to different device types, and the plurality of clock types correspond to a plurality of device types;
identifying a target device type of the plurality of device types, to which a target device belongs; and
transmitting, to the switch chip and the target device, a target clock signal transmitted by a target clock generator of the clock generators of the plurality of clock types. The target clock generator is a clock generator of a target clock type corresponding to the target device type.

In an exemplary embodiment, the transmitting, to the switch chip and the target device, a target clock signal transmitted by a target clock generator of the clock generators of the plurality of clock types includes:
generating a target control signal corresponding to the target device type; and
transmitting the target clock signal corresponding to the target control signal to the switch chip and the target device.

In an exemplary embodiment, the clock generators of the plurality of clock types include a first clock generator of a homologous type and a second clock generator of a non-homologous type, the first clock generator is configured to transmit a homologous clock signal, and the second clock generator is configured to transmit a non-homologous clock signal;
the generating a target control signal corresponding to the target device type includes: generating a first control signal in response to the target device type being a first type which is a device type adopting a high-speed serial computer expansion bus standard, and generating a second control signal in response to the target device type being a second type which is a device type adopting a compute express link protocol;
the transmitting the target clock signal corresponding to the target control signal to the switch chip and the target device includes: transmitting the homologous clock signal to the switch chip and the target device in response to receiving the first control signal, and transmitting the non-homologous clock signal to the switch chip and the target device in response to receiving the second control signal.

In an exemplary embodiment, a reference clock generator of the clock generators of the plurality of clock types is configured to generate a plurality of clock signals, and the receiving clock signals transmitted by clock generators of a plurality of clock types includes:
buffering the plurality of clock signals;
collecting signal parameters of the plurality of clock signals;
determining signal quality of each of the plurality of clock signals based on the signal parameters; and
determining a reference clock signal with the highest signal quality as a clock signal transmitted by the reference clock generator.

In an exemplary embodiment, the collecting signal parameters of the plurality of clock signals includes:
sampling the plurality of clock signals to obtain a plurality of sampling signals; and
calculating the signal parameters of the plurality of sampling signals, the signal parameter of each of the sampling signals including at least one of an amplitude parameter, a frequency parameter, a slope parameter and a jitter parameter.

In an exemplary embodiment, the identifying a target device type of the plurality of device types, to which a target device belongs includes:

receiving the target device type sent by a processor connected to the clock control device.

According to still another embodiment of the present application, a clock control apparatus for a switch chip is provided. The apparatus includes:

a receiving module configured to receive clock signals transmitted by clock generators of a plurality of clock types. A clock control device is connected to a switch chip, the switch chip uses clock signals of different clock types in response to controlling target devices belonging to different device types, and the plurality of clock types correspond to a plurality of device types;

an identification module configured to identify a target device type of the plurality of device types, to which the target device belongs; and a transmission module configured to transmit, to the switch chip and the target device, a target clock signal transmitted by a target clock generator of the clock generators of the plurality of clock types. The target clock generator is a clock generator of a target clock type corresponding to the target device type.

According to still another embodiment of the present application, a non-volatile readable storage medium storing a computer program therein is also provided. The computer program is configured to perform the steps in any one of the above method embodiments in response to being executed.

According to still another embodiment of the present application, an electronic device is also provided, including a memory and a processor. A computer program is stored in the memory, and the processor is configured to run the computer program to perform the steps in any one of the above method embodiments.

Through the present application, the clock controller controls the clock selector according to the target device type of the target device to transmit, to the switch chip and the target device, the target clock signal transmitted by the target clock generator of the clock generators of the plurality of clock types. That is, since the switch chip is required to correspond to the clock type of the target device, the target device type of the target device is obtained through the clock controller, and then the clock controller controls the clock selector according to the target device type to select and transmit the target clock signal to the switch chip and the target device.

DETAILED DESCRIPTION OF THE EMBODIMENTS

Embodiments of the present application will be described in detail with reference to the drawings and in combination with the embodiments hereinafter.

It should be noted that the terms "first", "second", and the like in the description, the claims, and the drawings of the present application and the above drawings are used to distinguish between similar objects, and are not necessarily used to describe a specific sequence or sequential order.

Figure 1:
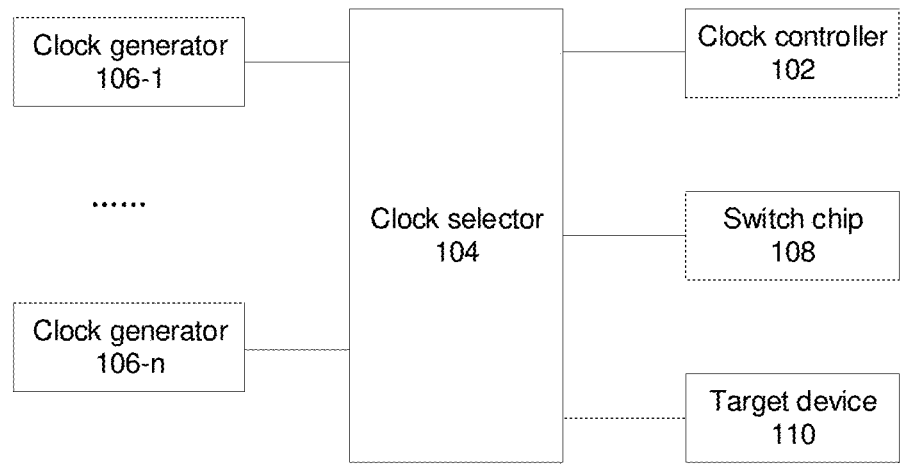
FIG. 1 is a schematic diagram I of a clock control device for a switch chip according to an embodiment of the present application.

A clock control device for a switch chip is provided in this embodiment. FIG. 1 is a schematic diagram I of a clock control device for a switch chip according to an embodiment of the present application. As shown in FIG. 1, the clock control device for a switch chip may include a clock controller 102 and a clock selector 104. The clock controller 102 is connected to the clock selector 104, the clock selector 104 is allowed to be connected to clock generators (106-1 to 106-n) of a plurality of clock types, a switch chip 108, and a target device 110, the switch chip 108 uses clock signals of different clock types in response to controlling target devices 110 belonging to different device types, and the plurality of clock types correspond to a plurality of device types; the clock controller 102 is configured to identify a target device type of the plurality of device types, to which the target device 110 belongs, and control the clock selector 104 to transmit, to the switch chip 108 and the target device 110, a target clock signal transmitted by a target clock generator of the clock generators of the plurality of clock types. The target clock generator is a clock generator of a target clock type corresponding to the target device 110 type.

Through the above device, the clock controller controls the clock selector according to the target device type of the target device to transmit, to the switch chip and the target device, the target clock signal transmitted by the target clock generator of the clock generators of the plurality of clock types, enabling the switch chip to automatically use a corresponding clock type when controlling target devices of different device types. That is, since the switch chip is required to correspond to the clock type of the target device, the target device type of the target device is obtained through the clock controller, and then the clock controller controls the clock selector according to the target device type to select and transmit the target clock signal to the switch chip and the target device, so that the switch chip and the target device may receive the corresponding target clock signal. As such, the problem of low clock adaptation efficiency of the switch chip may be solved, improving the clock adaptation efficiency of the switch chip.

In one embodiment of this application, in this embodiment, the clock control device is configured to receive the clock signals transmitted by the clock generators of the plurality of clock types, select a clock signal corresponding to the target device from the plurality of clock signals, and transmit the clock signal to the switch chip and the target device, enabling the switch chip to use a corresponding clock type when controlling target devices of different device types.

In one embodiment of this application, in this embodiment, the clock control device may include the clock controller and the clock selector, but is not limited thereby, and functions of the clock control device may be, but are not limited thereby, implemented through a plurality of devices in the clock control device, such as obtaining the target device type of the plurality of device types, to which the target device belongs through the clock controller, and controlling the clock selector according to the target device type to transmit, to the switch chip and the target device, the target clock signal transmitted by the target clock generator of the clock generators of the plurality of clock types.

In one embodiment of this application, in this embodiment, the clock controller may, but is not limited thereby, control the clock selector to transmit, to the switch chip and the target device, the target clock signal transmitted by the target clock generator of the clock generators of the plurality of clock types by controlling the magnitude of an output level of the target control signal. For example, when the target control signal outputs a low level, the clock selector is instructed to select a homologous clock. Alternatively, when the target control signal outputs a high level, the clock selector is instructed to select a non-homologous clock.

In one embodiment of this application, in this embodiment, the clock generator may be, but is not limited to, a device capable of generating and transmitting a clock signal, such as an external crystal oscillator (XTAL), a crystal oscillator, etc. The clock type of the clock generator may include, but is not limited to, a homologous clock and a non-homologous clock.

In one embodiment of this application, in this embodiment, the clock generator may be, but is not limited to, a device capable of sending a plurality of clock signals at the same time. For example, the clock control device receives a plurality of clock signals sent by the same clock generator and a plurality of clock signals sent by another clock generator of a different clock type. Alternatively, the clock control device receives a plurality of clock signals sent by the same clock generator and a single clock signal sent by another clock generator of a different clock type.

In one embodiment of this application, in this embodiment, the switch chip may be, but is not limited to, a device with a function of controlling the target device, such as a CXL SW chip. The clock type used by the switch chip may be, but is not limited thereby, determined based on the device type of the target device. For example, when the target device type of the target device is a PCIe device, the clock type used by the switch chip is determined to be a homologous clock. Alternatively, if the target device type of the target device is a CXL device, the clock type used by the switch chip is determined to be a non-homologous clock.

Figure 2:
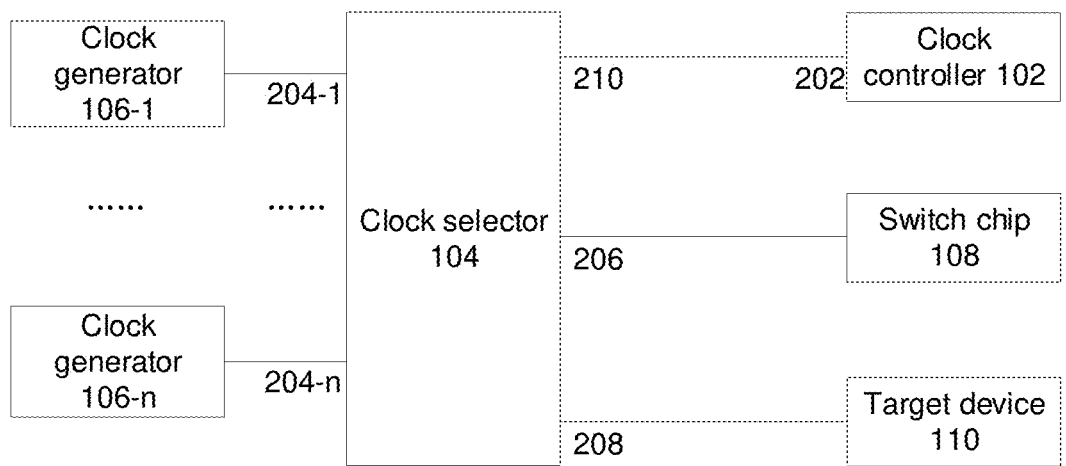
FIG. 2 is a schematic diagram II of a clock control device for a switch chip according to an embodiment of the present application.

In an exemplary embodiment, FIG. 2 is a schematic diagram II of a clock control device for a switch chip according to an embodiment of the present application. As shown in FIG. 2, a first control port 202 is deployed on the clock controller 102, and a plurality of clock ports (204-1 to 204-n), a first output port 206, a second output port 208 and a first signal port 210 are deployed on the clock selector 104. The first control port 202 is connected to the first signal port 210, the plurality of clock ports (204-1 to 204-n) are configured to be connected to the clock generators (106-1 to 106-n) of the plurality of clock types respectively, the first output port 206 is configured to be connected to the switch chip 108, and the second output port 208 is configured to be connected to the target device 110; the clock controller 102 is configured to generate a target control signal corresponding to the target device 110 type, and send the target control signal to the clock selector 104 through the first control port 202; the clock selector 104 is configured to receive the target control signal through the first signal port 210, and transmit the target clock signal received on a target clock port 212 corresponding to the target control signal to the first output port 206 and the second output port 208.

In one embodiment of this application, in this embodiment, a plurality of ports may be, but are not limited thereby, deployed on the clock controller. The clock controller may be, but is not limited thereby, connected to the clock selector through the first control port deployed thereon. The clock controller may send a signal to the clock selector through the first control port, the signal being used for controlling the clock selector to transmit, to the switch chip and the target device, the target clock signal transmitted by the target clock generator of the clock generators of the plurality of clock types.

In one embodiment of this application, in this embodiment, the plurality of ports that may be, but are not limited thereby, deployed on the clock selector include: the plurality of clock ports, the first output port, the second output port, the first signal port, etc.

In one embodiment of this application, in this embodiment, the plurality of clock ports deployed on the clock selector are connected to the clock generators of the plurality of clock types, and may be, but are not limited thereby, configured to receive clock signals sent by the clock generators of the plurality of clock types.

In one embodiment of this application, in this embodiment, the first output port deployed on the clock selector is connected to the switch chip, and may be, but is not limited thereby, configured to send the clock signal corresponding to the target device to the switch chip.

In one embodiment of this application, in this embodiment, the second output port deployed on the clock selector is connected to the target device, and may be, but is not limited thereby, configured to send the clock signal corresponding to the target device to the target device.

In one embodiment of this application, in this embodiment, the first control port deployed on the clock controller is connected to the clock selector, and may be, but is not limited thereby, configured to send the target control signal to the clock selector. For example, the clock controller generates the corresponding target control signal according to the target device type of the target device, and then transmits the target control signal to the clock selector through the first control port.

In one embodiment of this application, in this embodiment, the first signal port deployed on the clock selector is connected to the clock controller, and may be, but is not limited thereby, configured to receive the target control signal sent by the clock controller. For example, the clock controller transmits the target control signal through the first control port, and the clock selector receives the target control signal through the first signal port.

Figure 3:
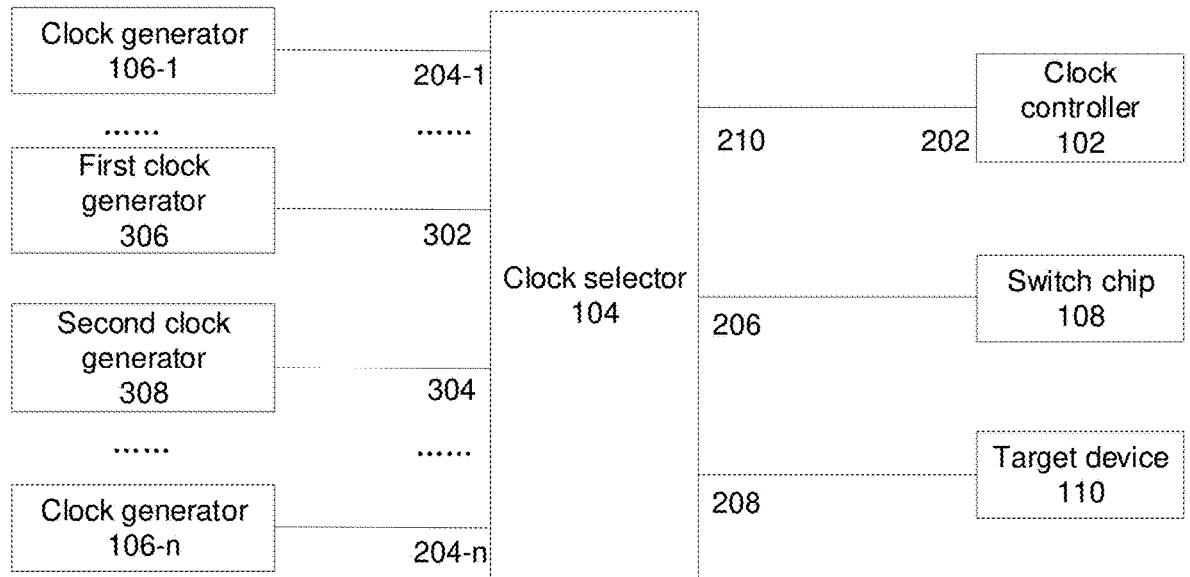
FIG. 3 is a schematic diagram III of a clock control device for a switch chip according to an embodiment of the present application.

In an exemplary embodiment, FIG. 3 is a schematic diagram III of a clock control device for a switch chip according to an embodiment of the present application. As shown in FIG. 3, the plurality of clock ports (204-1 to 204-n) include a first clock port 302 and a second clock port 304. The first clock port 302 is allowed to be connected to a first clock generator 306 of a homologous type, the second clock port 304 is allowed to be connected to a second clock generator 308 of a non-homologous type, the first clock generator 306 is configured to transmit a homologous clock signal, and the second clock generator 308 is configured to transmit a non-homologous clock signal; the clock controller 102 is configured to generate a first control signal when the target device 110 type is a first type which is a device type adopting a high-speed serial computer expansion bus standard, generate a second control signal when the target device 110 type is a second type which is a device type adopting a compute express link protocol, and send the first control signal or the second control signal to the clock selector 104 through the first control port 202; the clock selector 104 is configured to transmit the homologous clock signal to the first output port 206 and the second output port 208 when receiving the first control signal, and transmit the non-homologous clock signal to the first output port 206 and the second output port 208 when receiving the second control signal.

In one embodiment of this application, in this embodiment, the plurality of clock ports of the clock controller are configured to be connected to the clock generators of the plurality of clock types. The clock ports may include, but are not limited to, the first clock port and the second clock port. The first clock port and the second clock port are connected to clock generators of different clock types.

In one embodiment of this application, in this embodiment, the first clock generator is connected to the clock controller through the first clock port, and the first clock port is configured to receive the homologous clock signal sent by the first clock generator.

In one embodiment of this application, in this embodiment, the second clock generator is connected to the clock controller through the second clock port, and the second clock port is configured to receive the non-homologous clock signal sent by the second clock generator.

In one embodiment of this application, in this embodiment, the first control signal is used for transmitting the homologous clock signal to the first output port and the second output port, and the second control signal is used for transmitting the non-homologous clock signal to the first output port and the second output port. For example, the target control signal corresponding to the target device type is generated by the clock controller in the clock control device, and the first output port and the second output port are deployed on the clock selector in the clock control device. In this case, the clock selector transmits the homologous clock signal to the first output port and the second output port when receiving the first control signal; and the clock selector transmits the non-homologous clock signal to the first output port and the second output port when receiving the second control signal.

Figure 4:
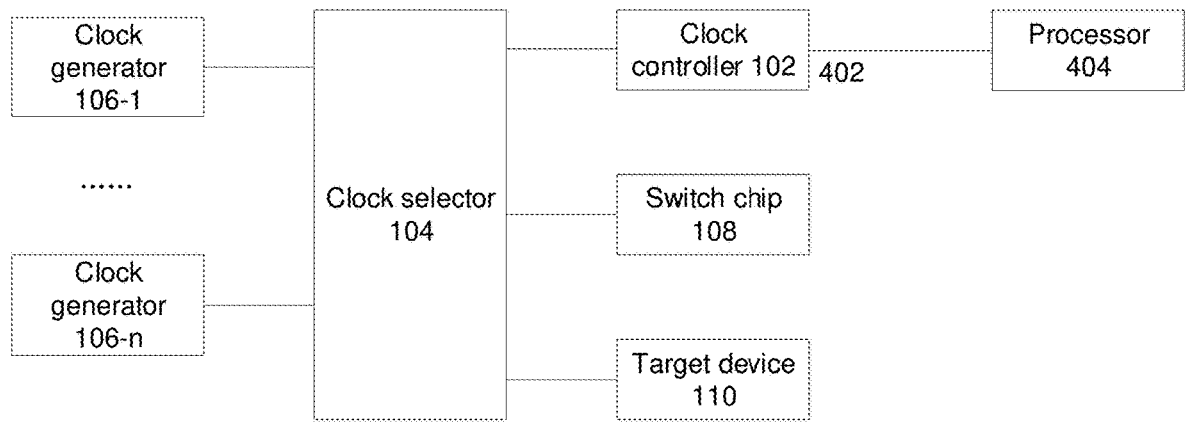
FIG. 4 is a schematic diagram IV of a clock control device for a switch chip according to an embodiment of the present application.

In an exemplary embodiment, FIG. 4 is a schematic diagram IV of a clock control device for a switch chip according to an embodiment of the present application. As shown in FIG. 4, a device type port 402 is deployed on the clock controller 102. The device type port 402 is allowed to be connected to a processor 404, and the device type port 402 is configured to receive the target device type sent by the processor 404.

In one embodiment of this application, in this embodiment, the processor may be, but is not limited thereby, deployed on a motherboard connected to the clock control device. The processor may, but is not limited thereby, read the target device type of the target device through a bus. For example, the processor reads the target device in a PCIe slot or CXL slot through a PCIe bus, and sends the target device type of the target device to the clock control device.

In one embodiment of this application, in this embodiment, the device type port is deployed on the clock controller. The device type port may be, but is not limited to, configured to be connected to the processor deployed on the motherboard. The target device type sent by the processor of the motherboard is received through the device type port.

In one embodiment of this application, in this embodiment, the clock control device may, but is not limited thereby, determine the target device type of the target device based on data received from the processor. For example, 0x50 and 0x56 indicate that the target device type is a PCIe device. In this case, when the clock control device receives 0x50 and 0x56 continuously, it may be determined that the target device type of the plurality of device types, to which the target device belongs is a PCIe device. Alternatively, for example, 0x27 and 0x29 indicate that the target device type is a CXL device. In this case, when the clock control device receives 0x27 and 0x29 continuously, it may be determined that the target device type of the plurality of device types, to which the target device belongs is a CXL device.

In one embodiment of this application, in this embodiment, the processor on the motherboard may be, but is not limited thereby, configured to obtain the target device type of the target device. For example, the processor on the motherboard is coupled to the target device through a set of PCIe x16 high-speed cables, and identifies the target device type of the target device through the PCIe x16 high-speed cables. The processor then sends the target device type of the target device to the clock controller through an I2C_CPU signal.

Figure 5:
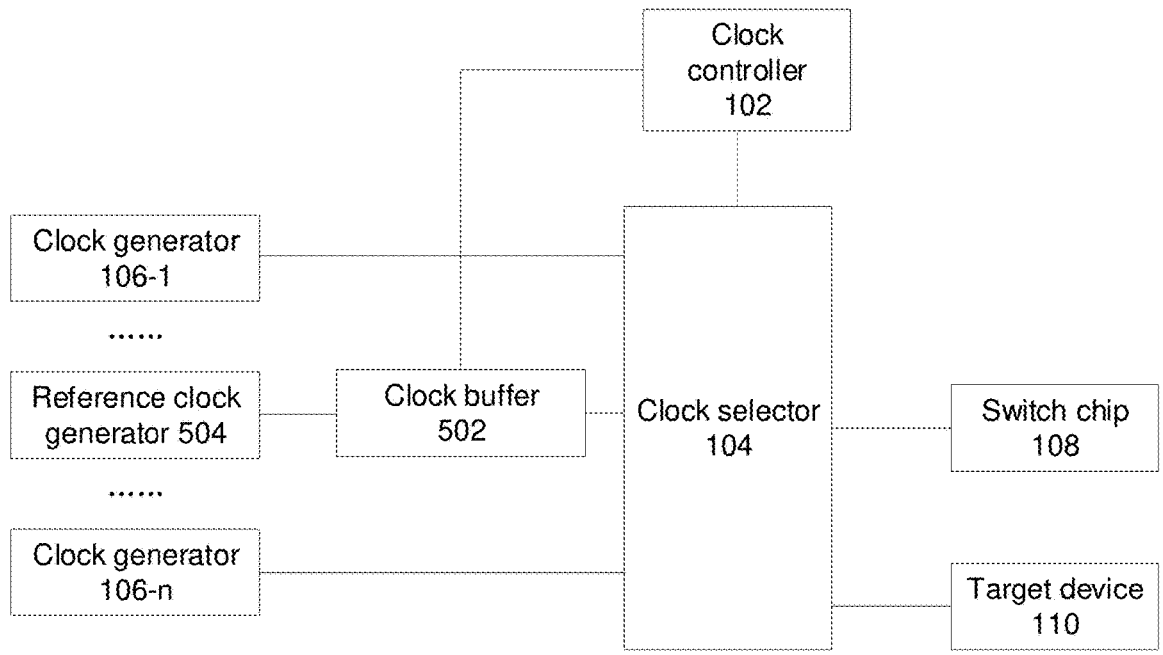
FIG. 5 is a schematic diagram V of a clock control device for a switch chip according to an embodiment of the present application.

In an exemplary embodiment, FIG. 5 is a schematic diagram V of a clock control device for a switch chip according to an embodiment of the present application. As shown in FIG. 5, the clock control device further includes a clock buffer 502. The clock controller 102 is connected to the clock buffer 502, and the clock buffer 502 is also connected between the clock selector 104 and a reference clock generator 504 of the clock generators (106-1 to 106-n) of the plurality of clock types; the reference clock generator 504 is configured to generate a plurality of clock signals; the clock buffer 502 is configured to buffer the plurality of clock signals; the clock controller 102 is configured to collect signal parameters of the plurality of clock signals, determine signal quality of each of the plurality of clock signals based on the signal parameters, and control the clock buffer 502 to transmit a reference clock signal with the highest signal quality to the clock selector 104.

In one embodiment of this application, in this embodiment, the plurality of clock signals may be, but are not limited thereby, buffered by the clock buffer in the clock control device. For example, when the clock controller receives, from the motherboard, the clock signals transmitted by the clock generators of the plurality of clock types, the plurality of clock signals transmitted by the motherboard may be buffered by the clock buffer.

In one embodiment of this application, in this embodiment, the signal parameters of the plurality of clock signals may be, but are not limited thereby, obtained by the clock controller performing calculation for the plurality of clock signals buffered in the clock buffer. For example, the clock controller first samples the plurality of clock signals buffered in the clock buffer, to obtain sampling signals, and then calculates the signal parameters of the sampling signals.

In one embodiment of this application, in this embodiment, the signal parameters are used to indicate signal quality of the clock signal, and the signal parameters may include, but are not limited to, amplitude, frequency, slope and jitter parameters of the clock signal, etc.

In one embodiment of this application, in this embodiment, the clock controller may, but is not limited thereby, select a clock signal with the best signal quality based on the signal parameters and determine the clock signal as the reference clock signal. For example, the clock controller calculates an average of the signal parameters of each clock signal, and determines a clock signal with a maximum average as the clock signal with the best signal quality, i.e., the reference clock signal. Alternatively, the clock controller calculates a weighted average of the signal parameters of each clock signal, and determines a clock signal with a maximum weighted average as the clock signal with the best signal quality, i.e., the reference clock signal.

Figure 6:
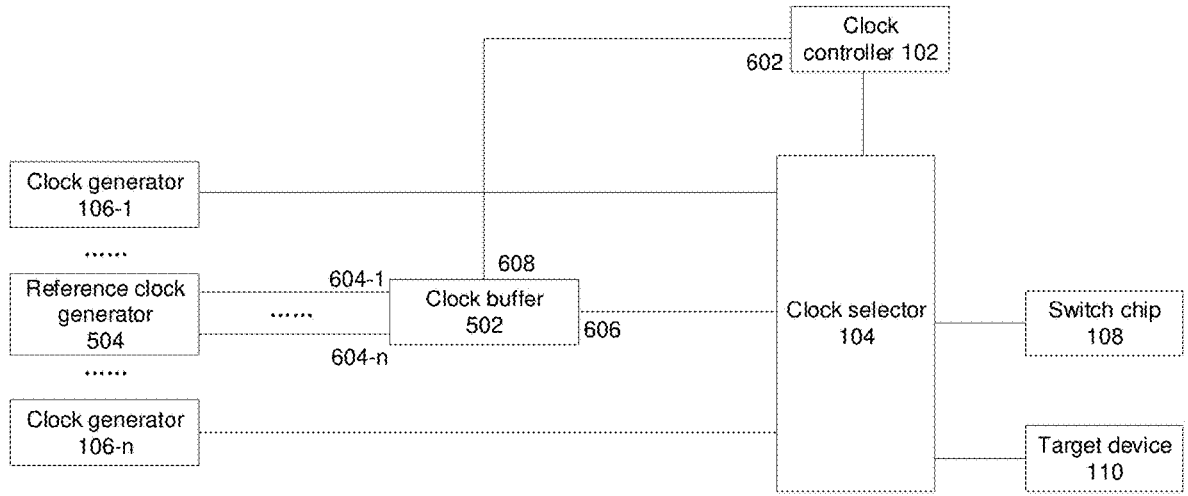
FIG. 6 is a schematic diagram VI of a clock control device for a switch chip according to an embodiment of the present application.

In an exemplary embodiment, FIG. 6 is a schematic diagram VI of a clock control device for a switch chip according to an embodiment of the present application. As shown in FIG. 6, a second control port 602 is deployed on the clock controller 102, and a plurality of reference clock ports (604-1 to 604-n), a third output port 606 and a second signal port 608 are deployed on the clock buffer 502. The second control port 602 is connected to the second signal port 608, the plurality of reference clock ports (604-1 to 604-n) are configured to be connected to the reference clock generator 504, and the third output port 606 is configured to be connected to the clock selector 104; the clock controller 102 is configured to generate a reference control signal corresponding to the reference clock signal, and send the reference control signal to the clock buffer 502 through the second control port 602; the clock buffer 502 is configured to receive the reference control signal through the second signal port 608, and transmit the reference clock signal corresponding to the reference control signal to the third output port 606.

In one embodiment of this application, in this embodiment, the second control port deployed on the clock controller may be, but is not limited thereby, connected to the second signal port of the clock buffer, and the second signal port may be, but is not limited thereby, configured to sample the plurality of clock signals to obtain a plurality of sampling signals.

In one embodiment of this application, in this embodiment, the reference clock port deployed on the clock buffer may be, but is not limited thereby, connected to the reference clock generator, and the reference clock port may be, but is not limited thereby, configured to receive the clock signal sent by the reference clock generator and perform a buffer operation.

In one embodiment of this application, in this embodiment, the third output port deployed on the clock buffer may be, but is not limited thereby, connected to the clock selector, the clock signal corresponding to the reference control signal may be, but is not limited thereby, determined based on the reference control signal sent by the clock controller, and the reference control signal is transmitted to the clock selector through the third output port.

Figure 7:
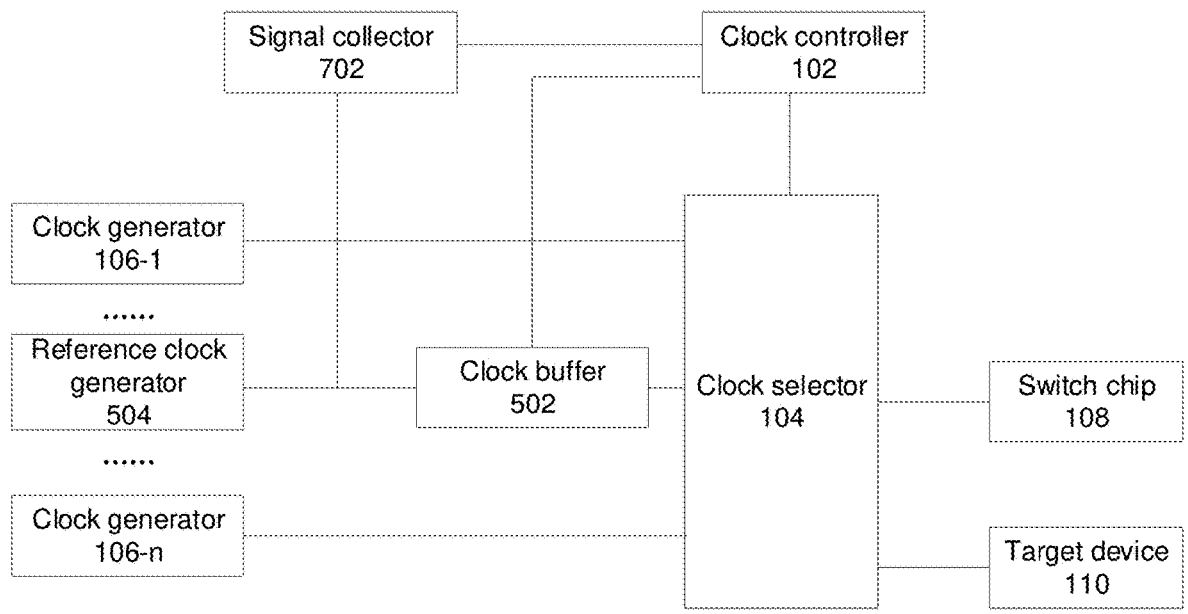
FIG. 7 is a schematic diagram VII of a clock control device for a switch chip according to an embodiment of the present application.

In an exemplary embodiment, FIG. 7 is a schematic diagram VII of a clock control device for a switch chip according to an embodiment of the present application. As shown in FIG. 7, the clock control device further includes a signal collector 702. The signal collector 702 is connected between the reference clock generator 504 and the clock controller 102; the signal collector 702 is configured to sample the plurality of clock signals to obtain a plurality of sampling signals, and transmit the plurality of sampling signals to the clock controller 102; the clock controller 102 is configured to calculate the signal parameters of the plurality of sampling signals, the signal parameter of each of the sampling signals including at least one of an amplitude parameter, a frequency parameter, a slope parameter and a jitter parameter, and convert the signal parameter of each of the sampling signals into the signal quality of each of the sampling signals.

In one embodiment of this application, in this embodiment, the signal collector is configured to sample each clock signal during a process of the clock generator sending the clock signal to the clock buffer, so as to obtain the plurality of sampling signals.

In one embodiment of this application, in this embodiment, the signal collector may, but is not limited thereby, determine signals of the plurality of clock signals in the same time period as the sampling signals. For example, a plurality of clock signals in the same time period are captured and determined to be the sampling signals.

In one embodiment of this application, in this embodiment, the signal parameters of the sampling signal are used to indicate the signal quality of the sampling signal. For example, the signal quality of the sampling signal may be, but is not limited thereby, determined based on an average of the amplitude parameter, the frequency parameter, the slope parameter and the jitter parameter. Alternatively, the signal quality of the sampling signal may be, but is not limited thereby, determined based on a weighted average of the amplitude parameter, the frequency parameter, the slope parameter and the jitter parameter.

According to another aspect of the embodiments of the present application, a switch board is also provided. Since the switch board is configured to implement the above embodiment and embodiments, the description is no longer repeated here.

Figure 8:
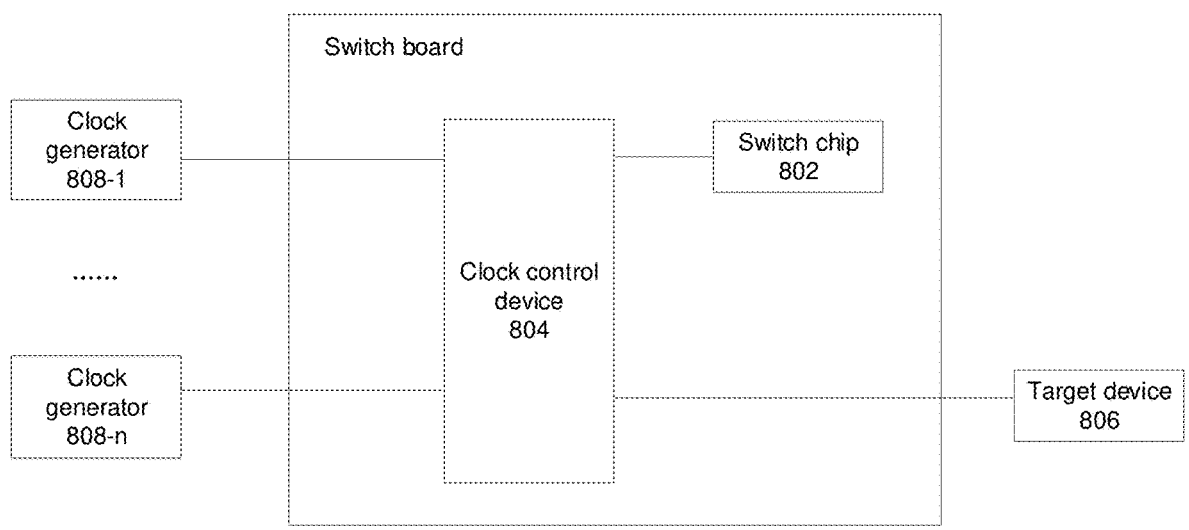
FIG. 8 is a schematic diagram of a switch board according to an embodiment of the present application.

FIG. 8 is a schematic diagram of a switch board according to an embodiment of the present application. As shown in FIG. 8, the switch board may include a switch chip 802 and a clock control device 804. The clock control device 804 is connected to the switch chip 802, and the clock control device 804 is allowed to be connected to a target device 806 and clock generators (808-1 to 808-n) of a plurality of clock types; the switch chip 802 uses clock signals of different clock types when controlling target devices 806 belonging to different device types, and the plurality of clock types correspond to a plurality of device types; the clock control device 804 is configured to identify a target device type of the plurality of device types, to which the target device 806 belongs, and transmit, to the switch chip 802 and the target device 806, a target clock signal transmitted by a target clock generator of the clock generators (808-1 to 808-$n$) of the plurality of clock types. The target clock generator is a clock generator of a target clock type corresponding to the target device type.

Through the above switch board, the clock controller controls the clock selector according to the target device type of the target device to transmit, to the switch chip and the target device, the target clock signal transmitted by the target clock generator of the clock generators of the plurality of clock types, enabling the switch chip to automatically use a corresponding clock type when controlling target devices of different device types. That is, since the switch chip is required to correspond to the clock type of the target device, the target device type of the target device is obtained through the clock controller, and then the clock controller controls the clock selector according to the target device type to select and transmit the target clock signal to the switch chip and the target device, so that the switch chip and the target device may receive the corresponding target clock signal. As such, the problem of low clock adaptation efficiency of the switch chip may be solved, improving the clock adaptation efficiency of the switch chip.

In an exemplary embodiment, the clock control device includes a clock controller and a clock selector. The clock controller is connected to the clock selector, and the clock selector is allowed to be connected to the clock generators of the plurality of clock types, the switch chip and the target device; the clock controller is configured to generate a target control signal corresponding to the target device type, and send the target control signal to the clock selector; the clock selector is configured to receive the target control signal, and transmit the target clock signal corresponding to the target control signal to the switch chip and the target device.

In one embodiment of this application, in this embodiment, the clock generators of the plurality of clock types may be, but are not limited thereby, deployed on the switch board. For example, a plurality of clock generators are deployed on the switch board. Alternatively, the clock generators of the plurality of clock types may be, but are not limited thereby, deployed on a device connected to the switch board. For example, the clock generators of the plurality of clock types are deployed on a motherboard connected to the switch board.

In one embodiment of this application, in this embodiment, the clock controller and the clock selector may be, but are not limited thereby, deployed on the switch board, and the clock controller may, but is not limited thereby, generate the target control signal based on the target device type and then send the target control signal to the clock selector, to control the clock selector to select and transmit the target clock signal to the switch chip and the target device.

In an exemplary embodiment, the clock generators of the plurality of clock types include a first clock generator of a homologous type and a second clock generator of a non-homologous type. The clock selector is connected to each of the first clock generator and the second clock generator, the first clock generator is configured to transmit a homologous clock signal, and the second clock generator is configured to transmit a non-homologous clock signal; the clock controller is configured to generate a first control signal when the target device type is a first type which is a device type adopting a high-speed serial computer expansion bus standard, generate a second control signal when the target device type is a second type which is a device type adopting a compute express link protocol, and send the first control signal or the second control signal to the clock selector; the clock selector is configured to transmit the homologous clock signal to the switch chip and the target device when receiving the first control signal, and transmit the non-homologous clock signal to the switch chip and the target device when receiving the second control signal.

In an exemplary embodiment, a reference clock generator of the clock generators of the plurality of clock types is allowed to generate a plurality of clock signals. The clock control device is configured to buffer the plurality of clock signals, collect signal parameters of the plurality of clock signals, determine signal quality of each of the plurality of clock signals based on the signal parameters, and determine a reference clock signal with the highest signal quality as a clock signal corresponding to the reference clock generator.

In one embodiment of this application, in this embodiment, the reference clock generator may generate a plurality of clock signals. For example, the clock control device is connected to the clock generators of the plurality of types, including, but not limited to, a homologous clock generator and a non-homologous clock generator. When the reference clock generator is a homologous clock generator, the homologous clock generator is allowed to generate a plurality of clock signals. Alternatively, when the reference clock generator is a non-homologous clock generator, the non-homologous clock generator is allowed to generate a plurality of clock signals.

In an exemplary embodiment, the clock control device includes a clock controller, a clock selector and a clock buffer. The clock controller is connected to the clock selector, the clock selector is allowed to be connected to the clock generators of the plurality of clock types, the switch chip and the target device, and the clock buffer is connected between the reference clock generator and the clock selector; the clock controller is configured to generate a reference control signal corresponding to the reference clock signal, send the reference control signal to the clock buffer, generate a target control signal corresponding to the target device type, send the target control signal to the clock selector; the clock buffer is configured to receive the reference control signal, and transmit the reference clock signal corresponding to the reference control signal to the clock selector; the clock selector is configured to receive the target control signal, and transmit the target clock signal corresponding to the target control signal to the switch chip and the target device.

In one embodiment of this application, in this embodiment, the clock buffer is connected between the reference clock generator and the clock selector, and the clock buffer is configured to buffer the clock signal sent by the reference clock generator to the clock selector. The clock buffer may, but is not limited thereby, determine, based on the reference control signal corresponding to the target device type indicated by the clock controller, the clock signal sent to the clock selector.

In one embodiment of this application, in this embodiment, the clock controller may be, but is not limited thereby, configured to control the clock buffer to send the reference clock signal to the clock selector. The clock controller is further configured to control the clock selector to send the target clock signal to the switch chip and the target device. For example, the clock controller receives the target device type of the target device and generates the reference control signal and the target control signal based on the target device type. The clock controller sends the reference control signal to the clock buffer, to control the clock buffer to transmit the reference clock signal to the clock selector. The clock controller sends the target control signal to the clock selector, to control the clock selector to transmit the target clock signal to the switch chip and the target device.

In an exemplary embodiment, the clock control device is further configured to sample the plurality of clock signals to obtain a plurality of sampling signals, calculate the signal parameters of the plurality of sampling signals, the signal parameter of each of the sampling signals including at least one of an amplitude parameter, a frequency parameter, a slope parameter and a jitter parameter, and convert the signal parameter of each of the sampling signals into the signal quality of each of the sampling signals.

In an exemplary embodiment, the clock control device is allowed to be connected to a processor. The clock control device is configured to receive the target device type sent by the processor.

In an exemplary embodiment, the switch board further includes an uplink connector, a downlink connector and a third clock generator. The third clock generator is connected to the clock control device, the clock control device is connected to a fourth clock generator of the processor through the uplink connector, and the clock generators of the plurality of clock types include the third clock generator and the fourth clock generator; the clock control device is connected to the target device through the downlink connector.

In one embodiment of this application, in this embodiment, the clock control device may be, but is not limited thereby, connected to the clock generators including the third clock generator and the fourth clock generator. The third clock generator may be directly connected to the clock control device, and the fourth clock generator of the processor that is not deployed on the switch board may be, but is not limited thereby, connected to the clock control device through the uplink connector of the switch board.

In one embodiment of this application, in this embodiment, the downlink connector of the switch board is configured to be connected to the target device, and device information of the target device may be, but is not limited thereby, obtained through the downlink connector. For example, information such as the manufacturer, capacity, speed, etc. of the target device may be obtained through the downlink connector.

Figure 9:
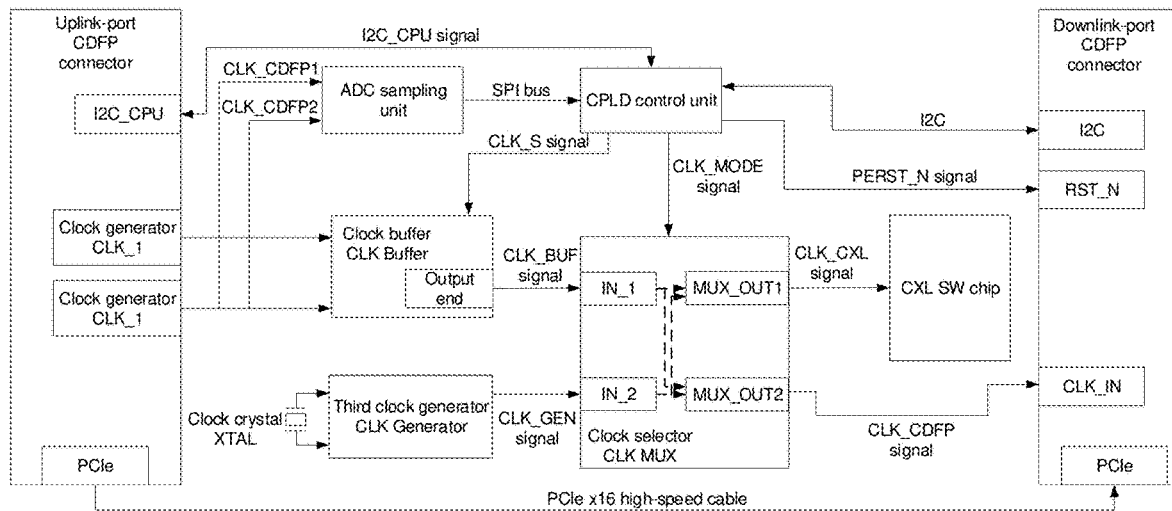
FIG. 9 is a schematic diagram of a working process of a switch board according to an embodiment of the present application.

In an exemplary embodiment, a switch board is provided, including a switch chip, a clock control device, a third clock generator, an uplink connector and a downlink connector. FIG. 9 is a schematic diagram of a working process of a switch board according to an embodiment of the present application. As shown in FIG. 9, the switch chip is a CXL SW chip, the clock control device includes a clock controller, a clock selector and a clock buffer. In one embodiment of this application, the clock controller is a complex programmable logic device (CPLD) control unit, and the clock selector is CLK MUX, the clock buffer is CLK Buffer, the third clock generator is CLK Generator, the uplink connector is an uplink-port compact duplex form factor pluggable module (CDFP) connector, and the downlink connector is a downlink-port CDFP connector. For example, a first clock generator configured to transmit a homologous clock signal is deployed on a motherboard, and the third clock generator CLK Generator is configured to transmit a non-homologous clock signal. In this case, the switch board may work in the following mode:

For example, the third clock generator CLK Generator includes a 25 MHz clock crystal XTAL. In this case, the XTAL provides an internal phase-locked loop (PLL) for the third clock generator, and accordingly, the third clock generator outputs a 100 MHz CLK_GEN clock signal.

The CPLD control unit reads information related to a target device of the downlink-port CDFP connector through I2C and PERST_N signals. For example, information such as the manufacturer, capacity, speed, etc. related to the target device is read through the I2C signal, and a reset operation, etc. is performed on the target device through the PERST_N signal.

The uplink-port CDFP connector is coupled to the downlink-port CDFP connector through a set of PCIe x16 high-speed cables. The uplink-port CDFP connector identifies a target device type of the target device through the PCIe x16 high-speed cables coupled to the downlink-port CDFP connector. A processor CPU of the uplink-port CDFP connector sends the target device type of the target device to the CPLD control unit through an I2C_CPU signal.

The uplink-port CDFP connector of the switch board is connected to the CDFP connector of the motherboard through a cable, to receive the homologous clock signal from the motherboard. An analog to digital converter (ADC) sampling unit (signal collector) samples a plurality of homologous clock signals from the motherboard, and transmits sampling signals to the CPLD control unit through a serial peripheral interface (SPI) bus. The CPLD control unit calculates signal parameters of the sampling signal: an amplitude parameter, a frequency parameter, a slope parameter, a jitter parameter, etc., and determines the homologous clock signal with the best signal quality based on the signal parameters.

For example, the homologous clock signals CLK_CDFP1 and CLK_CDFP2 sent by a clock generator (CLK_1) of the motherboard are received. In this case, the CPLD control unit controls the clock buffer CLK Buffer through a CLK_S signal to select and output the homologous clock signal with the best signal quality. For example, when the CLK_S outputs a low level, it indicates that the CLK_CDFP1 has the best signal quality, and the clock buffer CLK Buffer outputs the CLK_CDFP1 to CLK_BUF; and when the CLK_S outputs a high level, it indicates that the CLK_CDFP2 has the best signal quality, and the CLK Buffer outputs the CLK_CDFP2 to the CLK_BUF.

Under the control by a CLK_MODE signal sent by the CPLD control unit, the CLK MUX selects a corresponding clock for the target device interconnected with the downlink-port CDFP connector and the CXL SW in the following manner:

For example, when the CLK_MODE outputs a low level, the CLK MUX is instructed to select a homologous clock CLK_BUF. In this case, IN_1 of the CLK MUX outputs the homologous clock CLK_BUF to each of MUX_OUT1 and MUX_OUT2, and then the homologous clock CLK_BUF is input to the CXL SW through CLK_CXL and input to the target device interconnected with the downlink-port CDFP connector through CLK_CDFP, so that clocks of the target device interconnected with the downlink-port CDFP connector and the CXL SW are both homologous clocks.

For example, when the CLK_MODE outputs a high level, the CLK MUX is instructed to select a non-homologous clock CLK_GEN. In this case, IN_2 outputs the non-homologous clock CLK_GEN to each of the MUX_OUT1 and MUX_OUT2, and then the non-homologous clock CLK_GEN is input to the CXL SW through CLK_CXL and input to the target device interconnected with the downlink-port CDFP connector through the CLK_CDFP, so that clocks of the target device interconnected with the downlink-port CDFP connector and the CXL SW are both non-homologous clocks. I2C is Inter-Integrated Circuit. I2C_CPU is the specific I2C interface designated for communication with the CPU. CLK stands for clock. CLK_S is the clock select signal. CLK_BUF is the clock buffer circuit. CLK_GEN is the clock generator. IN represents input. CLK_MODE stands for clock mode. MUX_OUT is the multiplexer output. CLK_CXL is the clock for Compute Express Link. RST_N is reset not. PERST_N is power-on reset not. CLK_IN is the clock input.

Figure 10:
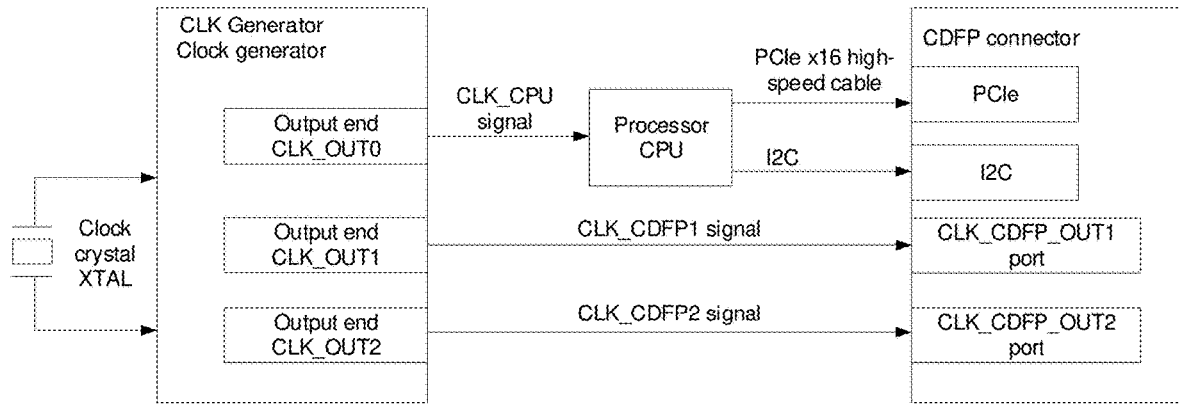
FIG. 10 is a schematic diagram of a motherboard on which a clock generator is deployed according to an embodiment of the present application.

In an exemplary embodiment, the clock control device is connected to the motherboard on which the clock generator is deployed. FIG. 10 is a schematic diagram of a motherboard on which a clock generator is deployed according to an embodiment of the present application. As shown in FIG. 10, the motherboard includes: the XTAL (a 25 MHz clock crystal), the clock generator CLK Generator, the processor CPU, the CDFP connector. The motherboard may send a clock signal to the clock control device through the following method. The clock crystal XTAL provides an internal PLL for the clock generator CLK Generator, thereby outputting a 100 MHz PCIe clock. The CLK Generator outputs a 25 MHz CLK_CPU clock to the CPU through an output end CLK_OUT0. The CPU is connected to the PCIe device of the CDFP connector through a set of PCIe x16 high-speed cables and connected to the I2C device of the CDFP connector through I2C. The CLK Generator outputs the 100 MHz homologous clock signal CLK_CDFP1 to a CLK_CDFP_OUT1 port of the CDFP connector through an output end CLK_OUT1, and outputs the 100 MHz homologous clock signal CLK_CDFP2 to a CLK_CDFP_OUT2 port of the CDFP connector through an output end CLK_OUT2. The CDFP connector is configured to be connected to the switch chip deployed on the switch board.

The motherboard may send the target device type to the clock controller through the following method: the CPU is connected to the clock controller of the switch board through an I2C bus, and sends the target device type (which may include, but is not limited to, a PCIe device and a CXL device) of the target device to the CPLD control unit through the I2C_CPU signal.

Figure 11:
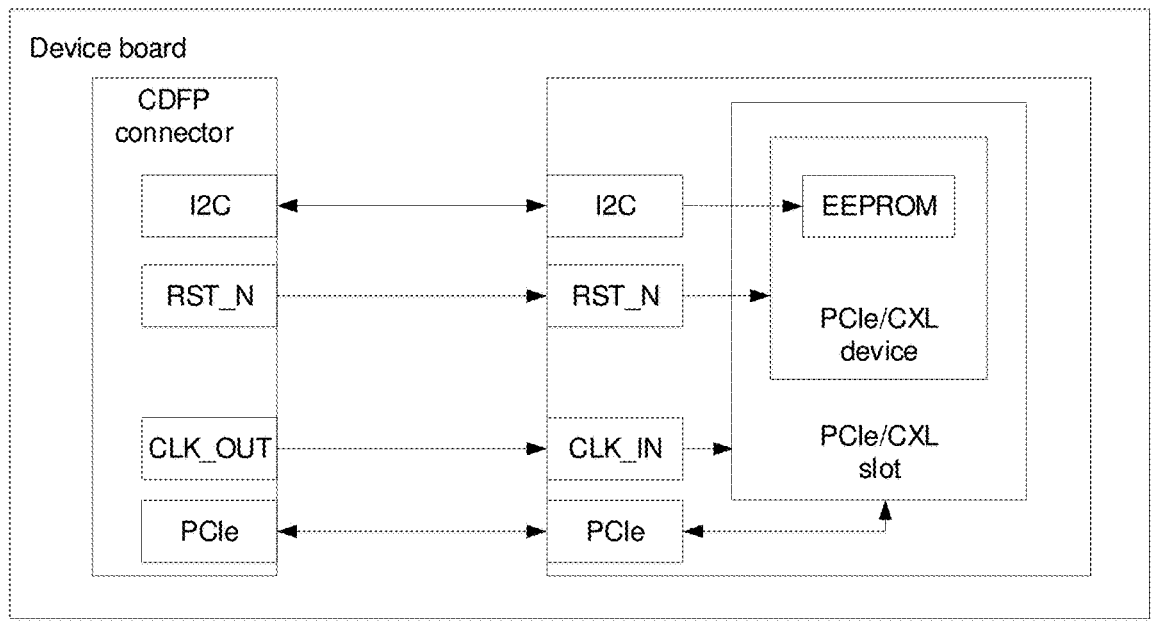
FIG. 11 is a schematic diagram of a device board on which a target device is deployed according to an embodiment of the present application.

In an exemplary embodiment, a device board on which a target device is deployed is provided. FIG. 11 is a schematic diagram of a device board on which a target device is deployed according to an embodiment of the present application. As shown in FIG. 11, the device board includes: a CDFP connector, a PCIe slot or CXL slot (PCIe/CXL slot), and a PCIe device or CXL device (PCIe/CXL device). The PCIe device or CXL device is provided with an electrically erasable programmable read-only memory (EEPROM), and the EEPROM is configured to store information such as the manufacturer, capacity, speed, etc. The CDFP connector obtains the information stored in the EEPROM through an I2C port. The CDFP connector performs a reset operation on the PCIe device or CXL device through RST_N (which may be, but is not limited thereby, configured to indicate a reset signal). The CDFP connector is connected to CLK_IN through CLK_OUT, to transmit a clock signal. The CDFP connector reads the device deployed in the slot through PCIe. The device board may send a target device type to a clock control device of a switch board in the following manner:

After the device board is powered on, a processor CPU of a motherboard automatically identifies the target device in the PCIe slot or CXL slot through a PCIe bus, and sends the target device type to a clock controller CPLD of the switch board through an I2C_CPU bus. When the clock controller CPLD receives signals such as 0x50, 0x56, etc. continuously, the target device type of the target device may be, but is not limited thereby, considered to be the PCIe device; and when the clock controller CPLD receives signals such as 0x27, 0x29, etc. continuously, the target device type of the target device may be, but is not limited thereby, considered to be the CXL device.

According to still another aspect of the embodiments of the present application, a clock control system for a switch chip is also provided. Since the switch board is configured to implement the above embodiment and embodiments, the description is no longer repeated here.

Figure 12:
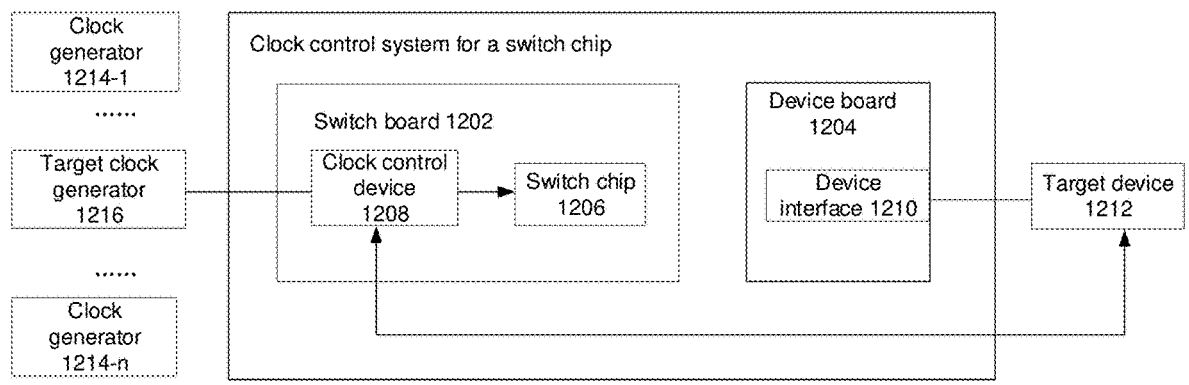
FIG. 12 is a schematic diagram of a clock control system for a switch chip according to an embodiment of the present application.

FIG. 12 is a schematic diagram of a clock control system for a switch chip according to an embodiment of the present application. As shown in FIG. 12, the clock control system for a switch chip may include a switch board 1202 and a device board 1204. A switch chip 1206 and a clock control device 1208 are deployed on the switch board 1202, and a device interface 1210 is deployed on the device board 1204; the device interface 1210 is configured to be connected to a target device 1212. The switch chip 1206 uses clock signals of different clock types when controlling target devices 1212 belonging to different device types, and the plurality of clock types correspond to a plurality of device types; the clock control device 1208 is configured to identify a target device type of the plurality of device types, to which the target device 1212 belongs, and transmit, to the switch chip 1206 and the target device 1212, a target clock signal transmitted by a target clock generator 1216 of the clock generators (1214-1 to 1214-n) of the plurality of clock types. The target clock generator is a clock generator of a target clock type corresponding to the target device type.

Through the above system, the clock controller controls the clock selector according to the target device type of the target device to transmit, to the switch chip and the target device, the target clock signal transmitted by the target clock generator of the clock generators of the plurality of clock types, enabling the switch chip to automatically use a corresponding clock type when controlling target devices of different device types. That is, since the switch chip is required to correspond to the clock type of the target device, the target device type of the target device is obtained through the clock controller, and then the clock controller controls the clock selector according to the target device type to select and transmit the target clock signal to the switch chip and the target device, so that the switch chip and the target device may receive the corresponding target clock signal. As such, the problem of low clock adaptation efficiency of the switch chip may be solved, improving the clock adaptation efficiency of the switch chip.

In an exemplary embodiment, a first control port is deployed on the clock controller, and a plurality of clock ports, a first output port, a second output port and a first signal port are deployed on the clock selector. The first control port is connected to the first signal port, the plurality of clock ports are configured to be connected to the clock generators of the plurality of clock types respectively, the first output port is configured to be connected to the switch chip, and the second output port is configured to be connected to the target device; the clock controller is configured to generate a target control signal corresponding to the target device type, and send the target control signal to the clock selector through the first control port; the clock selector is configured to receive the target control signal through the first signal port, and transmit the target clock signal received on a target clock port corresponding to the target control signal to the first output port and the second output port.

In an exemplary embodiment, the system further includes a motherboard. A third clock generator is deployed on the switch board, a fourth clock generator of a processor is deployed on the motherboard, and the clock control device includes a clock controller and a clock selector; the clock controller is connected to the clock selector, the clock selector is connected to the third clock generator, the fourth clock generator, the switch chip and the target device, the third clock generator is configured to transmit a non-homologous clock signal, and the fourth clock generator is configured to transmit a homologous clock signal; the clock controller is configured to generate a first control signal when the target device type is a first type which is a device type adopting a high-speed serial computer expansion bus standard, generate a second control signal when the target device type is a second type which is a device type adopting a compute express link protocol, and send the first control signal or the second control signal to the clock selector; the clock selector is configured to transmit the homologous clock signal to the switch chip and the target device when receiving the first control signal, and transmit the non-homologous clock signal to the switch chip and the target device when receiving the second control signal.

In one embodiment of this application, in this embodiment, the motherboard may include the clock generator, but is not limited thereby. The clock generator of the motherboard may, but is not limited thereby, provide a clock signal in the following manner: the XTAL provides the internal PLL for the CLK generator, thereby outputting the 100 MHz PCIe clock.

In one embodiment of this application, in this embodiment, the motherboard may include the clock generator and the processor, but is not limited thereby. The processor of the motherboard may, but is not limited thereby, obtain the target device type of the target device in the following manner: the CPU is connected to the clock controller of the switch board through the I2C bus, and sends the target device type (which may include, but is not limited to, a PCIe device and a CXL device) of the target device to the CPLD control unit through the I2C_CPU signal.

In an exemplary embodiment, the fourth clock generator is allowed to generate a plurality of clock signals, and the clock control device further includes a clock buffer. The clock buffer is connected between the fourth clock generator and the clock selector; the clock controller is configured to collect signal parameters of the plurality of clock signals, determine signal quality of each of the plurality of clock signals based on the signal parameters, determine a reference clock signal with the highest signal quality as a clock signal corresponding to the fourth clock generator, generate a reference control signal corresponding to the reference clock signal, and send the reference control signal to the clock buffer; the clock buffer is configured to buffer the plurality of clock signals, receive the reference control signal, and transmit the reference clock signal corresponding to the reference control signal to the clock selector.

In an exemplary embodiment, a second control port is deployed on the clock controller, and a plurality of reference clock ports, a third output port and a second signal port are deployed on the clock buffer. The second control port is connected to the second signal port, the plurality of reference clock ports are configured to be connected to the reference clock generator, and the third output port is configured to be connected to the clock selector; the clock controller is configured to generate a reference control signal corresponding to the reference clock signal, and send the reference control signal to the clock buffer through the second control port; the clock buffer is configured to receive the reference control signal through the second signal port, and transmit the reference clock signal corresponding to the reference control signal to the third output port.

In an exemplary embodiment, the clock control device further includes a signal collector. The signal collector is connected between the reference clock generator and the clock controller; the signal collector is configured to sample the plurality of clock signals to obtain a plurality of sampling signals, and transmit the plurality of sampling signals to the clock controller; the clock controller is configured to calculate signal parameters of the plurality of sampling signals, the signal parameter of each of the sampling signals including at least one of an amplitude parameter, a frequency parameter, a slope parameter and a jitter parameter, and convert the signal parameter of each of the sampling signals into the signal quality of each of the sampling signals.

In an exemplary embodiment, the processor is deployed on the motherboard, and the clock control device is connected to the processor. The processor is connected to the target device through the switch board and the device board; the processor is configured to output the target device type of the target device during training of the target device, send the target device type to the clock control device; the clock control device is configured to receive the target device type sent by the processor.

Figure 13:
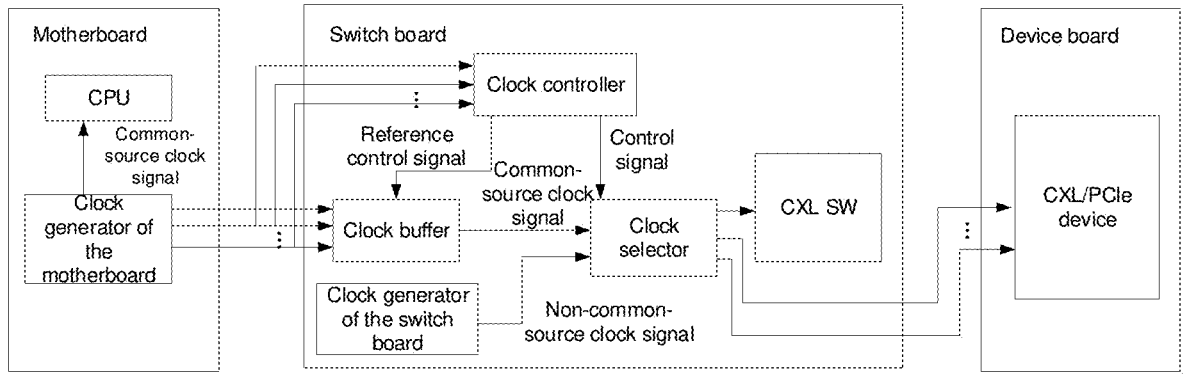
FIG. 13 is a schematic diagram of a clock control process in a clock control system for a switch chip according to an embodiment of the present application.

In an exemplary embodiment, a clock control system for a switch chip is provided. FIG. 13 is a schematic diagram of a clock control process in a clock control system for a switch chip according to an embodiment of the present application. As shown in FIG. 13, the clock control system for a switch chip includes a motherboard, a switch board and a device board. The motherboard includes a clock generator and a processor CPU deployed on the motherboard, and the clock generator of the motherboard is configured to provide a clock signal for the CPU and send a first clock signal to the switch board.

The switch board includes a clock buffer, a clock controller, a clock selector, a clock generator deployed on the switch board, and a switch chip CXL SW. The clock buffer, the clock controller and the clock selector are configured to parse a clock signal with highest quality from the first clock signals sent by the clock generator of the motherboard; the clock controller is further configured to parse a target device (which may be, but is not limited to, a CXL device or PCIe device) deployed on the device board and output a control signal to the clock buffer; the clock generator of the switch board is configured to output a second clock signal to the clock selector. The first clock signal and the second clock signal are of different types; the clock selector outputs a homologous clock or non-homologous clock to the CXL SW and the device board under the control of the control signal sent by the clock controller; the CXL device or PCIe device is deployed on the device board.

For example, the first clock signal is a homologous clock signal, and the second clock signal is a non-homologous clock signal. In this case, the clock control system for a switch chip may work in the following mode:

The clock generator of the motherboard sends a plurality of homologous clock signals to the processor of the motherboard and the clock buffer of the switch board, and the clock buffer of the switch board buffers each homologous clock signal.

In the process of the clock generator of the motherboard sending the homologous clock signals to the clock buffer of the switch board, the clock controller of the switch board samples the homologous clock signals sent by the clock generator of the motherboard, and performs analysis to determine an optimal homologous clock signal in the plurality of homologous clock signals sent by the clock generator of the motherboard. The clock controller sends a reference control signal to the clock buffer, to control the clock buffer to transmit the optimal homologous clock signal to the clock selector.

The clock generator of the switch board transmits a non-homologous clock signal to the clock selector.

The clock controller sends a corresponding control signal (first control signal or second control signal) to the clock selector according to a target device type (CXL device or PCIe device) of the target device deployed on the device board, to control the clock selector to select a clock signal corresponding to the target device type from the homologous clock signal and the non-homologous clock signal.

The clock selector transmits the clock signal corresponding to the target device type to the CXL SW and the target device according to the control signal sent by the clock controller.

The clock signal of CXL SW and the PCIe device may be, but is not limited thereby, determined to be a homologous clock when sourced from the clock generator of the motherboard; and the clock signal of CXL SW and the CXL device may be, but is not limited thereby, determined to be a non-homologous clock when sourced from the clock generator of the switch board.

Figure 14:
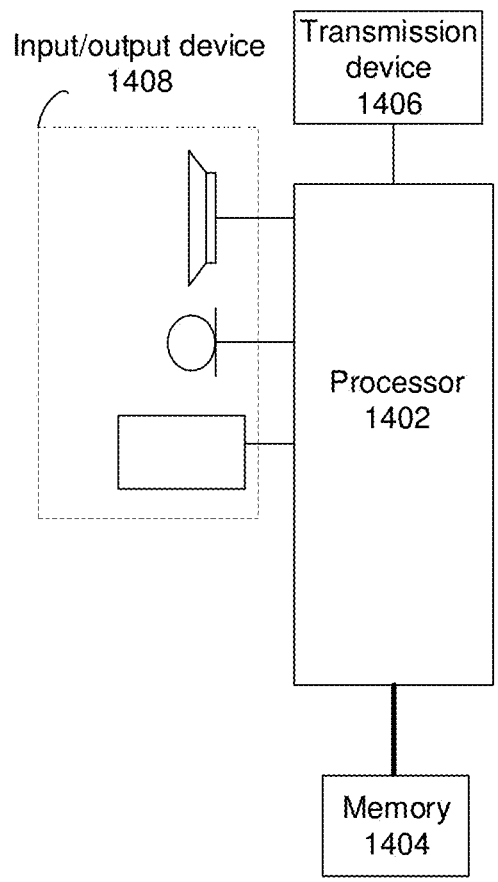
FIG. 14 is a block diagram of a hardware structure of a mobile terminal of a clock control method for a switch chip according to an embodiment of the present application.

A method embodiment provided in the embodiments of the present application can be executed on a mobile terminal, a computer terminal, or a similar computing apparatus. For example, the method embodiment is executed on a mobile terminal. FIG. 14 is a block diagram of a hardware structure of a mobile terminal of a clock control method for a switch chip according to an embodiment of the present application. As shown in FIG. 14, the mobile terminal may include one or more (only one is shown in FIG. 14) processors 1402 (the processor 1402 may include, but is not limited to, a processing apparatus such as a microprocessor MCU or a programmable logic device FPGA) and a memory 1404 configured to store data. The mobile terminal may further include a transmission device 1406 configured for a communication function and an input/output device 1408. Those of ordinary skill in the art may understand that the structure shown in FIG. 14 is merely illustrative, and does not limit the structure of the mobile terminal. For example, the mobile terminal may further include more or fewer components than those shown in FIG. 14, or have a configuration different from that shown in FIG. 14.

The memory 1404 may be configured to store computer programs, such as a software program and a module of application software, and a computer program corresponding to the clock control method for a switch chip in this embodiment of the present application. The processor 1402 runs the computer programs stored in the memory 1404, to execute various functional applications and data processing, i.e., implement the above method. The memory 1404 may include a high-speed random access memory, and may further include a non-volatile memory, such as one or more magnetic storage apparatuses, a flash memory, or other non-volatile solid-state memories. In some examples, the memory 1404 may include a memory configured remotely relative to the processor 1402, and these remote memories may be connected to the mobile terminal through a network. Examples of the network include, but are not limited to, the Internet, an intranet, a local area network, a mobile communication network and combinations thereof.

The transmission device 1406 is configured to receive or send data via a network. Examples of the network may include a wireless network provided by a communication provider of the mobile terminal. In an example, the transmission device 1406 includes a network interface controller (NIC), which can be connected to other network devices through a base station so as to communicate with the Internet. In an example, the transmission device 1406 may be a radio frequency (RF) module, which is configured to wirelessly communicate with the Internet.

Figure 15:
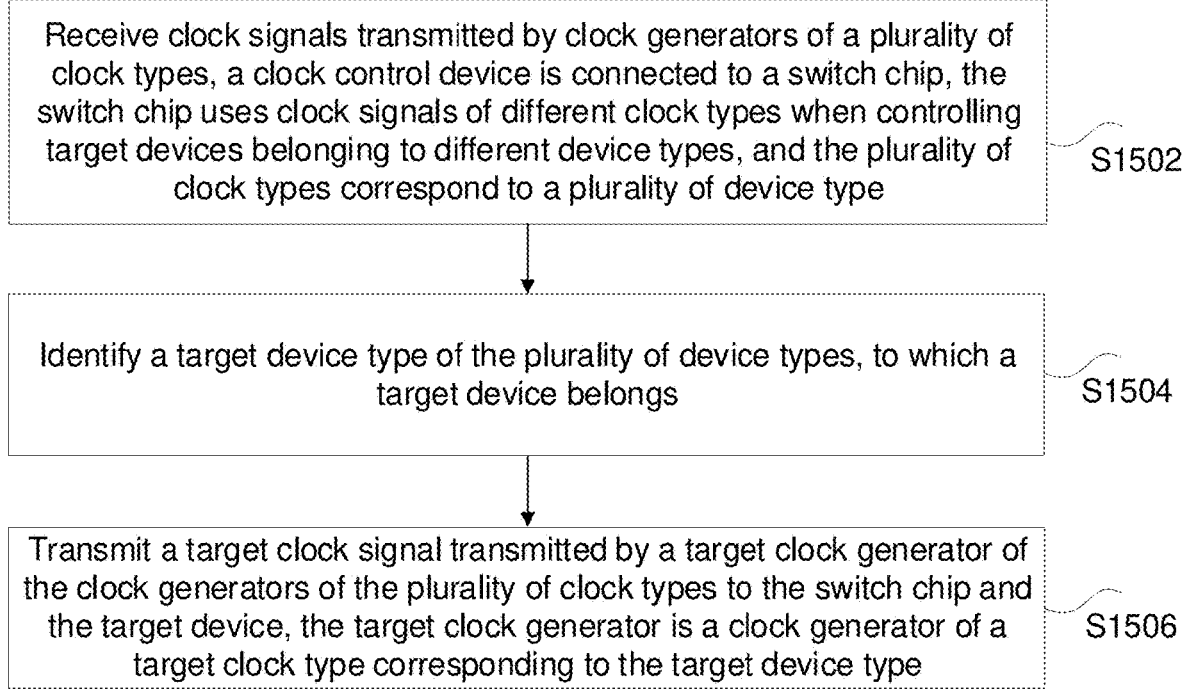
FIG. 15 is a flow chart of clock control for a switch chip according to an embodiment of the present application.

In this embodiment, a clock control method for a switch chip to be run on the above mobile terminal is provided. FIG. 15 is a flow chart of clock control for a switch chip according to an embodiment of the present application. As shown in FIG. 15, the process includes the following steps:

at step S1502, clock signals transmitted by clock generators of a plurality of clock types are received. A clock control device is connected to a switch chip, the switch chip uses clock signals of different clock types when controlling target devices belonging to different device types, and the plurality of clock types correspond to a plurality of device types;

at step S1504, a target device type of the plurality of device types, to which a target device belongs is identified; and at step S1506, a target clock signal transmitted by a target clock generator of the clock generators of the plurality of clock types is transmitted to the switch chip and the target device. The target clock generator is a clock generator of a target clock type corresponding to the target device type.

Through the above steps, a clock controller controls a clock selector according to the target device type of the target device to transmit, to the switch chip and the target device, the target clock signal transmitted by the target clock generator of the clock generators of the plurality of clock types, enabling the switch chip to automatically use a corresponding clock type when controlling target devices of different device types. That is, since the switch chip is required to correspond to the clock type of the target device, the target device type of the target device is obtained through the clock controller, and then the clock controller controls the clock selector according to the target device type to select and transmit the target clock signal to the switch chip and the target device, so that the switch chip and the target device may receive the corresponding target clock signal. As such, the problem of low clock adaptation efficiency of the switch chip may be solved, improving the clock adaptation efficiency of the switch chip.

The execution subject of the above steps may be the clock control device. The clock control device may include the clock controller and the clock selector, but is not limited thereby; may, but is not limited thereby, identify the target device type of the plurality of device types, to which the target device belongs through the clock controller; and may, but is not limited thereby, transmit, to the switch chip and the target device through the clock selector, the target clock signal transmitted by the target clock generator of the target clock type corresponding to the target device type.

In the technical solution provided by step S1502, the clock generator may be, but is not limited to, a device capable of generating and transmitting a clock signal, such as an external crystal oscillator (XTAL), a crystal oscillator, etc. The clock type of the clock generator may include, but is not limited to, a homologous clock and a non-homologous clock.

In one embodiment of this application, in this embodiment, the clock generator may be, but is not limited to, a device capable of sending a plurality of clock signals at the same time. For example, the clock control device receives a plurality of clock signals sent by the same clock generator and a plurality of clock signals sent by another clock generator of a different clock type. Alternatively, the clock control device receives a plurality of clock signals sent by the same clock generator and a single clock signal sent by another clock generator of a different clock type.

In one embodiment of this application, in this embodiment, the target device may be, but is not limited to, a device of one of the plurality of device types, such as an RC, a switch, an endpoint, etc. of a device type adopting a high-speed serial computer expansion bus standard. Alternatively, the target device may be a CXL accelerator card, a CXL switch, etc. of a device type adopting a compute express link protocol.

In one embodiment of this application, in this embodiment, the switch chip may be, but is not limited to, a device with a function of controlling the target device, such as a CXL SW chip. The clock type used by the switch chip may be, but is not limited thereby, determined based on the device type of the target device. For example, when the target device type of the target device is a PCIe device, the clock type used by the switch chip is determined to be a homologous clock. Alternatively, if the target device type of the target device is a CXL device, the clock type used by the switch chip is determined to be a non-homologous clock.

In the technical solution provided by step S1504, the target device type may be, but is not limited thereby, transmitted to the clock control device by a processor on a motherboard. For example, when the clock control device is started, the processor deployed on the motherboard automatically identifies the target device in a PCIe slot or CXL slot through a PCIe bus, and notifies the clock control device of the identified target device type through an I2C_CPU bus.

In an embodiment, the target device type of the plurality of device types, to which the target device belongs may be, but is not limited thereby, identified in the following manner of: receiving the target device type sent by the processor connected to the clock control device.

In one embodiment of this application, in this embodiment, the processor may be, but is not limited thereby, deployed on the motherboard connected to the clock control device. The processor may, but is not limited thereby, read the target device type of the target device through a bus. For example, the processor reads the target device in the PCIe slot or CXL slot through the PCIe bus, and sends the target device type of the target device to the clock control device.

In one embodiment of this application, in this embodiment, the clock control device may be, but is not limited thereby, configured to receive the target device type, and the clock control device may, but is not limited thereby, select, from the clock signals transmitted by the clock generators of the plurality of clock types, the clock signal corresponding to the target device type according to the target device type.

In one embodiment of this application, in this embodiment, the clock control device may, but is not limited thereby, determine the target device type of the target device based on data received from the processor. For example, 0x50 and 0x56 indicate that the target device type is a PCIe device. In this case, when the clock control device receives 0x50 and 0x56 continuously, it may be determined that the target device type of the plurality of device types, to which the target device belongs is a PCIe device. Alternatively, for example, 0x27 and 0x29 indicate that the target device type is a CXL device. In this case, when the clock control device receives 0x27 and 0x29 continuously, it may be determined that the target device type of the plurality of device types, to which the target device belongs is a CXL device.

In the technical solution provided by step S1506, the target clock type may be, but is not limited thereby, determined from the plurality of clock types based on the target device type of the target device. For example, the clock type required by the switch chip and the target device is determined to be a homologous clock based on the target device type of the target device. Alternatively, the clock type required by the switch chip and the target device is determined to be a non-homologous clock based on the target device type of the target device.

In one embodiment of this application, in this embodiment, the clock generator sending the target clock type may be, but is not limited thereby, determined to be the target clock generator. For example, two clock generators of the homologous clock type and two clock generators of the non-homologous clock type send a plurality of clock signals at the same time. In this case, when the clock type required by the switch chip and the target device is determined to be a homologous clock based on the target device type of the target device, the two clock generators of the homologous clock type may be, but are not limited thereby, determined to be the target clock generators. Alternatively, the better of the two clock generators of the homologous clock type is selected and determined to be the target clock generator.

In an embodiment, the target clock signal transmitted by the target clock generator of the clock generators of the plurality of clock types may be, but is not limited thereby, transmitted to the switch chip and the target device in the following manner: generating a target control signal corresponding to the target device type; and transmitting the target clock signal corresponding to the target control signal to the switch chip and the target device.

In one embodiment of this application, in this embodiment, the target control signal is used to instruct the clock control device to select the target clock signal transmitted by the target clock generator of the clock generators of the plurality of clock types for transmission. For example, a clock generator A of the homologous clock type sends a clock signal A and a clock signal B, and a clock generator B of the non-homologous clock type sends a clock signal C and a clock signal D. In this case, when the target control signal indicates that the switch chip and the target device require a clock signal of the homologous clock type, the clock generator A sending the clock signal A and the clock signal B may be, but is not limited thereby, determined to be the target clock generator, and a clock signal may be, but is not limited thereby, selected from the clock signal A and the clock signal B and determined to be the target clock signal for transmission.

In one embodiment of this application, in this embodiment, the clock control device may include the clock controller and the clock selector, but is not limited thereby, the target control signal corresponding to the target device type may be, but is not limited thereby, generated by the clock controller, and the target clock signal corresponding to the target control signal may be, but is not limited thereby, transmitted to the switch chip and the target device by the clock selector. For example, the clock controller generates the target control signal according to the target device type of the target device and transmits the target control signal to the clock selector. The clock selector selects the target clock signal from all the clock signals according to the target control signal for transmission. Alternatively, the clock controller generates the target control signal according to the target device type of the target device and transmits the target control signal to the clock selector. The clock selector screens out first clock signals of a clock type indicated by the target control signal, and then selects the target clock signal from the first clock signals for transmission.

In one embodiment of this application, in this embodiment, the clock controller may, but is not limited thereby, instruct the clock selector to select the corresponding target clock signal by controlling the magnitude of an output level of the target control signal. For example, when the target control signal outputs a low level, the clock selector is instructed to select a homologous clock. Alternatively, when the target control signal outputs a high level, the clock selector is instructed to select a non-homologous clock.

In one embodiment of this application, in this embodiment, the target control signal may be, but is not limited thereby, received through a first signal port of the clock selector; and the target clock signal received on a target clock port corresponding to the target control signal is transmitted to a first output port and a second output port.

In an embodiment, the clock generators of the plurality of clock types include a first clock generator of a homologous type and a second clock generator of a non-homologous type. The first clock generator is configured to transmit a homologous clock signal, and the second clock generator is configured to transmit a non-homologous clock signal. Generating the target control signal corresponding to the target device type includes: generating a first control signal when the target device type is a first type which is a device type adopting a high-speed serial computer expansion bus standard, and generating a second control signal when the target device type is a second type which is a device type adopting a compute express link protocol. Transmitting the target clock signal corresponding to the target control signal to the switch chip and the target device includes: transmitting the homologous clock signal to the switch chip and the target device when the first control signal is received, and transmitting the non-homologous clock signal to the switch chip and the target device when the second control signal is received.

In one embodiment of this application, in this embodiment, the first control signal is used for transmitting the homologous clock signal to the first output port and the second output port, and the second control signal is used for transmitting the non-homologous clock signal to the first output port and the second output port. For example, the target control signal corresponding to the target device type is generated by the clock controller in the clock control device, and the first output port and the second output port are deployed on the clock selector in the clock control device. In this case, the clock selector transmits the homologous clock signal to the first output port and the second output port when receiving the first control signal; and the clock selector transmits the non-homologous clock signal to the first output port and the second output port when receiving the second control signal.

In one embodiment of this application, in this embodiment, the first output port and the second output port may be, but are not limited thereby, configured to transmit a clock signal to the switch chip and the target device. For example, the first output port is connected to the switch chip, and the second output port is connected to the target device. In this case, the clock signal is transmitted to the switch chip and the target device through the first output port and the second output port.

In one embodiment of this application, in this embodiment, a plurality of clock ports, the first output port, the second output port and the first signal port may be, but are not limited thereby, deployed on the clock selector. The first clock port is allowed to be connected to the first clock generator of the homologous type, the second clock port is allowed to be connected to the second clock generator of the non-homologous type, the first clock generator is configured to transmit the homologous clock signal, and the second clock generator is configured to transmit the non-homologous clock signal.

In an embodiment, a reference clock generator of the clock generators of the plurality of clock types is configured to generate a plurality of clock signals. Clock signals transmitted by the clock generators of the plurality of clock types may be, but are not limited thereby, received in the following manner: buffering the plurality of clock signals; collecting signal parameters of the plurality of clock signals; determining signal quality of each of the plurality of clock signals based on the signal parameters; and determining a reference clock signal with the highest signal quality as a clock signal transmitted by the reference clock generator.

In one embodiment of this application, in this embodiment, the plurality of clock signals may be, but are not limited thereby, buffered by the clock buffer in the clock control device. For example, when the clock controller receives, from the motherboard, the clock signals transmitted by the clock generators of the plurality of clock types, the plurality of clock signals transmitted by the motherboard may be buffered by the clock buffer.

In one embodiment of this application, in this embodiment, the signal parameters of the plurality of clock signals may be, but are not limited thereby, obtained by performing calculation for the plurality of clock signals buffered in the clock buffer. For example, first, the plurality of clock signals buffered in the clock buffer are sampled, to obtain sampling signals, and then signal parameters of the sampling signals are calculated.

In one embodiment of this application, in this embodiment, the signal parameters are used to indicate signal quality of the clock signal, and the signal parameters may include, but are not limited to, amplitude, frequency, slope and jitter parameters of the clock signal, etc.

In one embodiment of this application, in this embodiment, the reference clock signal may be, but is not limited thereby, determined by selecting a clock signal with the best signal quality based on the signal parameters. For example, an average of the signal parameters of each clock signal is calculated, and a clock signal with a maximum average is determined to be the clock signal with the best signal quality, i.e., the reference clock signal. Alternatively, a weighted average of the signal parameters of each clock signal is calculated, and a clock signal with a maximum weighted average is determined to be the clock signal with the best signal quality, i.e., the reference clock signal.

In one embodiment of this application, in this embodiment, a second control port is deployed on the clock controller, and a plurality of reference clock ports, a third output port and a second signal port are deployed on the clock buffer. The second control port is connected to the second signal port, the plurality of reference clock ports are configured to be connected to the reference clock generator, and the third output port is configured to be connected to the clock selector; the clock controller is configured to generate a reference control signal corresponding to the reference clock signal, and send the reference control signal to the clock buffer through the second control port; the clock buffer is configured to receive the reference control signal through the second signal port, and transmit the reference clock signal corresponding to the reference control signal to the third output port.

In an embodiment, the signal parameters of the plurality of clock signals may be, but are not limited thereby, collected in the following manner: sampling the plurality of clock signals to obtain a plurality of sampling signals; and calculating signal parameters of the plurality of sampling signals. The signal parameter of each of the sampling signals includes at least one of an amplitude parameter, a frequency parameter, a slope parameter and a jitter parameter.

In one embodiment of this application, in this embodiment, signals of the plurality of clock signals in the same time period may be, but are not limited thereby, determined to be the sampling signals. For example, a plurality of clock signals in the same time period are captured and determined to be the sampling signals.

In one embodiment of this application, in this embodiment, the signal parameters of the sampling signal are used to indicate the signal quality of the sampling signal. For example, the signal quality of the sampling signal may be, but is not limited thereby, determined based on an average of the amplitude parameter, the frequency parameter, the slope parameter and the jitter parameter. Alternatively, the signal quality of the sampling signal may be, but is not limited thereby, determined based on a weighted average of the amplitude parameter, the frequency parameter, the slope parameter and the jitter parameter.

In one embodiment of this application, in this embodiment, the clock control device further includes a signal collector. The signal collector is connected between the reference clock generator and the clock controller; the signal collector is configured to sample the plurality of clock signals to obtain a plurality of sampling signals, and transmit the plurality of sampling signals to the clock controller.

Figure 16:
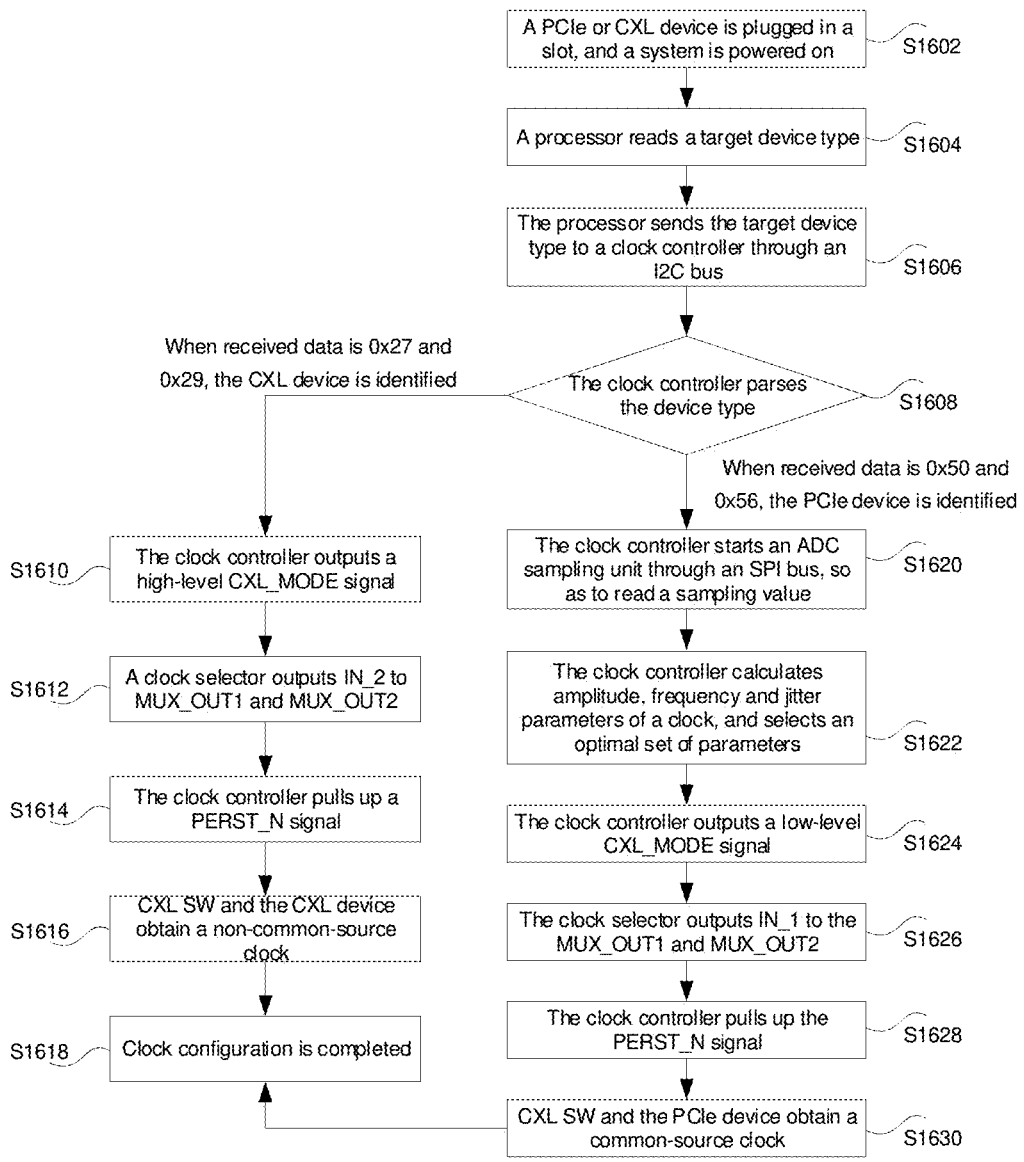
FIG. 16 is a schematic diagram of a clock control process in a clock control system for a switch chip according to an embodiment of the present application.

In an exemplary embodiment, a clock control system for a switch chip is provided. FIG. 16 is a schematic diagram of a clock control process in a clock control system for a switch chip according to an embodiment of the present application. As shown in FIG. 16, the clock control process may be, but is not limited thereby, include the following steps:

at step S1602, a user plugs a PCIe device or CXL device into a slot of a device board, and powers on the entire clock control system for the switch chip;

at step S1604, during the process of training a target device by a processor, the processor CPU of a motherboard reads a target device type of the target device in the slot of the device board;

at step S1606, after reading the target device type, the processor sends the target device type to a clock controller CPLD of the switch board through an I2C bus;

at step S1608, the clock controller CPLD parses the target device type;

and when the target device is the CXL device (when received data is 0x27 and 0x29, the clock controller may, but is not limited thereby, perform parsing to obtain the target device, which is the CXL device), step S1610 to step S1618 are performed:

at step S1610, the clock controller CPLD outputs a high-level CXL_MODE signal (i.e., target control signal);

at step S1612, a clock selector CLK_MUX outputs IN_2 to MUX_OUT1 and MUX_OUT2, the MUX_OUT1 performs output to the switch chip CXL SW, and the MUX_OUT2 performs output to the CXL device;

at step S1614, the clock controller CPLD pulls up a PERST_N signal (i.e., reference clock signal);

at step S1616, the switch chip CXL SW and the CXL device obtain a non-homologous clock; and at step S1618, clock configuration is completed.

When the target device is the PCIe device (when received data is 0x50 and 0x56, the clock controller may, but is not limited thereby, perform parsing to obtain the target device, which is the PCIe device), step S1620 to step S1632 are performed:

at step S1620, the clock controller CPLD starts an ADC sampling unit through an SPI bus, so as to read a sampling signal;

at step S1622, the clock controller CPLD calculates signal parameters of the sampling signal, and selects a reference clock signal with highest signal quality;

at step S1624, the clock controller CPLD outputs a low-level CXL_MODE signal (i.e., target control signal);

at step S1626, the clock selector CLK MUX outputs IN_1 to the MUX_OUT1 and MUX_OUT2, the MUX_OUT1 performs output to the switch chip CXL SW, and the MUX_OUT2 performs output to the PCIe device;

at step S1628, the clock controller CPLD pulls up the PERST_N signal (i.e., reference clock signal);

at step S1630, the switch chip CXL SW and the PCIe device obtain a homologous clock; and at step S1632, clock configuration is completed.

Through the above description of the embodiments, those skilled in the art could clearly learn that the method in the above embodiments may be implemented with software and a necessary general-purpose hardware platform or with hardware, while in many cases the former is a preferable implementation. Based on such an understanding, the essence or a portion contributing to the related technologies of the technical solutions of the present application may be embodied in the form of a software products. The computer software product is stored in a storage medium (such as a ROM/RAM, a diskette, or an optical disk), and includes several instructions used to enable a terminal apparatus (which may be a cell phone, a computer, a server, a network device, etc.) to execute the method of each embodiment of the present application.

This embodiment further provides a clock control apparatus for a switch chip. The apparatus is configured to implement the above embodiments and embodiments, and the description is no longer repeated here. As used hereinafter, the term "module" may be a combination of software and/or hardware that implements a preset function. Although the apparatus described in the following embodiment is implemented in software, an implementation in hardware or a combination of software and hardware is possible and conceivable.

Figure 17:
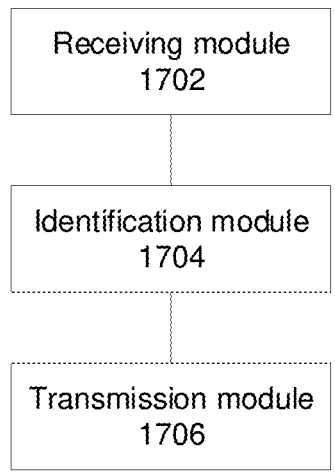
FIG. 17 is a block diagram of a structure of a clock control apparatus for a switch chip according to an embodiment of the present application.

FIG. 17 is a block diagram of a structure of a clock control apparatus for a switch chip according to an embodiment of the present application. As shown in FIG. 17, the apparatus includes:

a receiving module 1702 configured to receive clock signals transmitted by clock generators of a plurality of clock types. A clock control device is connected to the switch chip, the switch chip uses clock signals of different clock types when controlling target devices belonging to different device types, and the plurality of clock types correspond to a plurality of device types;

an identification module 1704 configured to identify a target device type of the plurality of device types, to which the target device belongs; and a transmission module 1706 configured to transmit, to the switch chip and the target device, a target clock signal transmitted by a target clock generator of the clock generators of the plurality of clock types. The target clock generator is a clock generator of a target clock type corresponding to the target device type.

Through the above apparatus, a clock controller controls a clock selector according to the target device type of the target device to transmit, to the switch chip and the target device, the target clock signal transmitted by the target clock generator of the clock generators of the plurality of clock types, enabling the switch chip to automatically use a corresponding clock type when controlling target devices of different device types. That is, since the switch chip is required to correspond to the clock type of the target device, the target device type of the target device is obtained through the clock controller, and then the clock controller controls the clock selector according to the target device type to select and transmit the target clock signal to the switch chip and the target device, so that the switch chip and the target device may receive the corresponding target clock signal. As such, the problem of low clock adaptation efficiency of the switch chip may be solved, improving the clock adaptation efficiency of the switch chip.

In an exemplary embodiment, the transmission module is configured to:

generate a target control signal corresponding to the target device type; and transmit the target clock signal corresponding to the target control signal to the switch chip and the target device.

In an exemplary embodiment, the transmission module is further configured to:

when generating the target control signal corresponding to the target device type, generate a first control signal when the target device type is a first type which is a device type adopting a high-speed serial computer expansion bus standard, and generate a second control signal when the target device type is a second type which is a device type adopting a compute express link protocol; and when transmitting the target clock signal corresponding to the target control signal to the switch chip and the target device, transmit the homologous clock signal to the switch chip and the target device when the first control signal is received, and transmit the non-homologous clock signal to the switch chip and the target device when the second control signal is received.

In an exemplary embodiment, the transmission module is further configured to:

buffer the plurality of clock signals;

collect signal parameters of the plurality of clock signals;

determine signal quality of each of the plurality of clock signals based on the signal parameters; and determine a reference clock signal with the highest signal quality as a clock signal transmitted by the reference clock generator.

In an exemplary embodiment, the transmission module is further configured to:

sample the plurality of clock signals to obtain a plurality of sampling signals; and calculate the signal parameters of the plurality of sampling signals, the signal parameter of each of the sampling signals including at least one of an amplitude parameter, a frequency parameter, a slope parameter and a jitter parameter.

In an exemplary embodiment, the identification module is further configured to:

receive the target device type sent by a processor connected to the clock control device.

It should be noted that each of the above modules may be realized by software or hardware. In the case of the hardware, the modules may be realized, but is not limited thereby, in the following way: all the modules are in the same processor; or the modules are separately in different processors in the form of any combinations.

An embodiment of the present application further provides a non-volatile readable storage medium storing a computer program therein. The computer program is configured to perform the steps in any of the above method embodiments when executed.

In an example embodiment, the non-volatile readable storage medium may include, but is not limited to various media that can store computer programs, such as a USB flash disk, a read-only memory (ROM), a random access memory (RAM), a mobile hard disk, a magnetic disk, or an optical disk.

Figure 18:
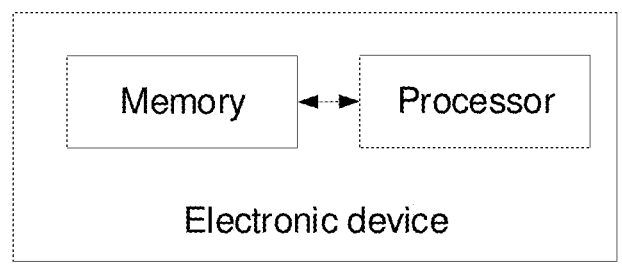
FIG. 18 is a schematic diagram of an electronic device according to an embodiment of the present application.

An embodiment of the present application further provides an electronic device. FIG. 18 is a schematic diagram of an electronic device according to an embodiment of the present application. As shown in FIG. 18, the electronic device includes a memory and a processor. The memory stores a computer program, and the processor is configured to run the computer program to perform the steps in any one of the above method embodiments.

In an exemplary embodiment, the electronic device may further include a transmission device and an input/output device The transmission device is connected to the processor, and the input/output device is connected to the processor.

Examples in this embodiment may refer to the examples described in the above embodiments and the exemplary embodiments, and are no longer repeated here in this embodiment.

Obviously, those skilled in the art should understand that the modules or steps of the present application may be implemented with a general-purpose computing device. The modules or steps may be centralized on a single computing device or distributed on a network consisting of a plurality of computing devices, may be implemented with program codes executable by the computing device, and thus may be stored in a storage device and executed by the computing device. Moreover, in some cases, the steps shown or described may be performed in an order different from the order here or may be separately produced as individual integrated circuit modules, or a plurality of the modules or steps may be produced as a single integrated circuit module. As such, the present application is not limited to any particular combination of hardware and software. The above embodiments are just embodiments of the present application and are not used for limiting the present application. For those skilled in the art, the present application may have various modifications and variations. Any modification, equivalent substitution, improvement and the like made within the principle of the present application shall all fall in the protection scope of the present application.

What is claimed is:

1. A clock control device for a switch chip, wherein the clock control device comprises a clock controller and a clock selector, wherein the clock controller is connected to the clock selector, the clock selector is allowed to be connected to clock generators of a plurality of clock types, a switch chip, and a target device, the switch chip uses clock signals of different clock types in response to controlling target devices belonging to different device types, and the plurality of clock types correspond to a plurality of device types;

the clock controller is configured to identify a target device type of the plurality of device types, to which the target device belongs, and control the clock selector to transmit, to the switch chip and the target device, a target clock signal transmitted by a target clock generator of the clock generators of the plurality of clock types, wherein the target clock generator is a clock generator of a target clock type corresponding to the target device type; and a first control port is deployed on the clock controller, and a plurality of clock ports, a first output port, a second output port and a first signal port are deployed on the clock selector, wherein, the first control port is connected to the first signal port, the plurality of clock ports are configured to be connected to the clock generators of the plurality of clock types respectively, the first output port is configured to be connected to the switch chip, and the second output port is configured to be connected to the target device; the clock controller is configured to generate a target control signal corresponding to the target device type, and send the target control signal to the clock selector through the first control port; and, the clock selector is configured to receive the target control signal through the first signal port, and transmit the target clock signal received on a target clock port corresponding to the target control signal to the first output port and the second output port.

2. The device according to claim 1, wherein the plurality of clock ports comprise a first clock port and a second clock port, wherein the first clock port is allowed to be connected to a first clock generator of a homologous type, the second clock port is allowed to be connected to a second clock generator of a non-homologous type, the first clock generator is configured to transmit a homologous clock signal, and the second clock generator is configured to transmit a non-homologous clock signal;

the clock controller is configured to generate a first control signal in response to the target device type being a first type which is a device type adopting a high-speed serial computer expansion bus standard, generate a second control signal in response to the target device type being a second type which is a device type adopting a compute express link protocol, and send the first control signal or the second control signal to the clock selector through the first control port; and the clock selector is configured to transmit the homologous clock signal to the first output port and the second output port in response to receiving the first control signal, and transmit the non-homologous clock signal to the first output port and the second output port in response to receiving the second control signal.

3. The device according to claim 1, wherein a device type port is deployed on the clock controller, and the device type port is allowed to be connected to a processor;

the device type port is configured to receive the target device type sent by the processor.

4. The device according to claim 1, wherein the clock control device further comprises a clock buffer, wherein the clock controller is connected to the clock buffer, and the clock buffer is also connected between the clock selector and a reference clock generator of the clock generators of the plurality of clock types;

the reference clock generator is configured to generate a plurality of clock signals;

the clock buffer is configured to buffer the plurality of clock signals; and the clock controller is configured to collect signal parameters of the plurality of clock signals, determine signal quality of each of the plurality of clock signals based on the signal parameters, and control the clock buffer to transmit a reference clock signal with the highest signal quality to the clock selector.

5. The device according to claim 4, wherein a second control port is deployed on the clock controller, and a plurality of reference clock ports, a third output port and a second signal port are deployed on the clock buffer, wherein the second control port is connected to the second signal port, the plurality of reference clock ports are configured to be connected to the reference clock generator, and the third output port is configured to be connected to the clock selector;

the clock controller is configured to generate a reference control signal corresponding to the reference clock signal, and send the reference control signal to the clock buffer through the second control port; and the clock buffer is configured to receive the reference control signal through the second signal port, and transmit the reference clock signal corresponding to the reference control signal to the third output port.

6. The device according to claim 4, wherein the clock control device further comprises a signal collector, wherein the signal collector is connected between the reference clock generator and the clock controller;

the signal collector is configured to sample the plurality of clock signals to obtain a plurality of sampling signals, and transmit the plurality of sampling signals to the clock controller; and the clock controller is configured to calculate the signal parameters of the plurality of sampling signals, and convert the signal parameter of each of the sampling signals into the signal quality of each of the sampling signals, wherein the signal parameter of each of the sampling signals comprising at least one of an amplitude parameter, a frequency parameter, a slope parameter and a jitter parameter.

7. A switch board, comprising a switch chip and a clock control device, wherein the clock control device is connected to the switch chip, and the clock control device is allowed to be connected to a target device and clock generators of a plurality of clock types;

the switch chip uses clock signals of different clock types in response to controlling target devices belonging to different device types, and the plurality of clock types correspond to a plurality of device types;

the clock control device is configured to identify a target device type of the plurality of device types, to which the target device belongs, and transmit, to the switch chip and the target device, a target clock signal transmitted by a target clock generator of the clock generators of the plurality of clock types, wherein the target clock generator is a clock generator of a target clock type corresponding to the target device type; and the clock control device comprises a clock controller and a clock selector, wherein a first control port is deployed on the clock controller, and a plurality of clock ports, a first output port, a second output port and a first signal port are deployed on the clock selector, wherein, the first control port is connected to the first signal port, the plurality of clock ports are configured to be connected to the clock generators of the plurality of clock types respectively, the first output port is configured to be connected to the switch chip, and the second output port is configured to be connected to the target device; the clock controller is configured to generate a target control signal corresponding to the target device type, and send the target control signal to the clock selector through the first control port; and, the clock selector is configured to receive the target control signal through the first signal port, and transmit the target clock signal received on a target clock port corresponding to the target control signal to the first output port and the second output port.

8. The switch board according to claim 7, wherein
the clock controller is connected to the clock selector, and the clock selector is allowed to be connected to the clock generators of the plurality of clock types, the switch chip and the target device;
the clock controller is configured to generate a target control signal corresponding to the target device type, and send the target control signal to the clock selector; and
the clock selector is configured to receive the target control signal, and transmit the target clock signal corresponding to the target control signal to the switch chip and the target device.

9. The switch board according to claim 8, wherein the clock generators of the plurality of clock types comprise a first clock generator of a homologous type and a second clock generator of a non-homologous type;
the clock selector is connected to each of the first clock generator and the second clock generator, the first clock generator is configured to transmit a homologous clock signal, and the second clock generator is configured to transmit a non-homologous clock signal;
the clock controller is configured to generate a first control signal in response to the target device type being a first type which is a device type adopting a high-speed serial computer expansion bus standard, generate a second control signal in response to the target device type being a second type which is a device type adopting a compute express link protocol, and send the first control signal or the second control signal to the clock selector; and
the clock selector is configured to transmit the homologous clock signal to the switch chip and the target device in response to receiving the first control signal, and transmit the non-homologous clock signal to the switch chip and the target device in response to receiving the second control signal.

10. The switch board according to claim 7, wherein a reference clock generator of the clock generators of the plurality of clock types is allowed to generate a plurality of clock signals, wherein
the clock control device is configured to buffer the plurality of clock signals, collect signal parameters of the plurality of clock signals, determine signal quality of each of the plurality of clock signals based on the signal parameters, and determine a reference clock signal with the highest signal quality as a clock signal corresponding to the reference clock generator.

11. The switch board according to claim 10, wherein the clock control device comprises a clock controller, a clock selector and a clock buffer, wherein
the clock controller is connected to the clock selector, the clock selector is allowed to be connected to the clock generators of the plurality of clock types, the switch chip and the target device, and the clock buffer is connected between the reference clock generator and the clock selector;
the clock controller is configured to generate a reference control signal corresponding to the reference clock signal, send the reference control signal to the clock buffer, generate a target control signal corresponding to the target device type, and send the target control signal to the clock selector;
the clock buffer is configured to receive the reference control signal, and transmit the reference clock signal corresponding to the reference control signal to the clock selector; and
the clock selector is configured to receive the target control signal, and transmit the target clock signal corresponding to the target control signal to the switch chip and the target device.

12. The switch board according to claim 10, wherein the clock control device is further configured to: sample the plurality of clock signals to obtain a plurality of sampling signals, calculate the signal parameters of the plurality of sampling signals, and convert the signal parameter of each of the sampling signals into the signal quality of each of the sampling signals, wherein the signal parameter of each of the sampling signals comprising at least one of an amplitude parameter, a frequency parameter, a slope parameter and a jitter parameter.

13. The switch board according to claim 7, wherein the clock control device is allowed to be connected to a processor, wherein
the clock control device is configured to receive the target device type sent by the processor.

14. The switch board according to claim 7, further comprising an uplink connector, a downlink connector and a third clock generator, wherein
the third clock generator is connected to the clock control device, the clock control device is connected to a fourth clock generator of a processor through the uplink connector, and the clock generators of the plurality of clock types comprise the third clock generator and the fourth clock generator; and
the clock control device is connected to the target device through the downlink connector.

15. A clock control method for a switch chip, wherein the method is applied to a clock control device, and comprises:
receiving clock signals transmitted by clock generators of a plurality of clock types, wherein the clock control device is connected to a switch chip, the switch chip uses clock signals of different clock types in response to controlling target devices belonging to different device types, and the plurality of clock types correspond to a plurality of device types;
identifying a target device type of the plurality of device types, to which a target device belongs; and
transmitting, to the switch chip and the target device, a target clock signal transmitted by a target clock generator of the clock generators of the plurality of clock types, wherein the target clock generator is a clock generator of a target clock type corresponding to the target device type;

wherein the clock control device comprises a clock controller and a clock selector, wherein a first control port is deployed on the clock controller, and a plurality of clock ports, a first output port, a second output port and a first signal port are deployed on the clock selector, wherein, the first control port is connected to the first signal port, the plurality of clock ports are configured to be connected to the clock generators of the plurality of clock types respectively, the first output port is configured to be connected to the switch chip, and the second output port is configured to be connected to the target device; the clock controller is configured to generate a target control signal corresponding to the target device type, and send the target control signal to the clock selector through the first control port; and, the clock selector is configured to receive the target control signal through the first signal port, and transmit the target clock signal received on a target clock port corresponding to the target control signal to the first output port and the second output port.

16. The method according to claim 15, wherein the transmitting, to the switch chip and the target device, a target clock signal transmitted by a target clock generator of the clock generators of the plurality of clock types comprises:
generating a target control signal corresponding to the target device type;
transmitting the target clock signal corresponding to the target control signal to the switch chip and the target device; or
the identifying a target device type of the plurality of device types comprises, to which the target device belongs:
receiving the target device type sent by a processor connected to the clock control device.

17. The method according to claim 16, wherein the clock generators of the plurality of clock types comprise a first clock generator of a homologous type and a second clock generator of a non-homologous type, the first clock generator is configured to transmit a homologous clock signal, and the second clock generator is configured to transmit a non-homologous clock signal;

the generating a target control signal corresponding to the target device type comprises: generating a first control signal in response to the target device type being a first type which is a device type adopting a high-speed serial computer expansion bus standard, and generating a second control signal in response to the target device type being a second type which is a device type adopting a compute express link protocol;
the transmitting the target clock signal corresponding to the target control signal to the switch chip and the target device comprises: transmitting the homologous clock signal to the switch chip and the target device in response to receiving the first control signal, and transmitting the non-homologous clock signal to the switch chip and the target device in response to receiving the second control signal.

18. The method according to claim 16, wherein a reference clock generator of the clock generators of the plurality of clock types is configured to generate a plurality of clock signals, wherein the receiving clock signals transmitted by clock generators of a plurality of clock types comprises:
buffering the plurality of clock signals;
collecting signal parameters of the plurality of clock signals;
determining signal quality of each of the plurality of clock signals based on the signal parameters; and
determining a reference clock signal with the highest signal quality as a clock signal transmitted by the reference clock generator.

19. The method according to claim 18, wherein the collecting signal parameters of the plurality of clock signals comprises:
sampling the plurality of clock signals to obtain a plurality of sampling signals; and
calculating the signal parameters of the plurality of sampling signals, the signal parameter of each of the sampling signals comprising at least one of an amplitude parameter, a frequency parameter, a slope parameter and a jitter parameter.

* * * * *